(12) United States Patent
Kasako

(10) Patent No.: US 8,521,978 B2
(45) Date of Patent: Aug. 27, 2013

(54) STORAGE APPARATUS AND METHOD FOR CONTROLLING STORAGE APPARATUS

(75) Inventor: Naohisa Kasako, Odawara (JP)

(73) Assignee: Hitachi, Ltd., Tokyo (JP)

( * ) Notice: Subject to any disclaimer, the term of this patent is extended or adjusted under 35 U.S.C. 154(b) by 746 days.

(21) Appl. No.: 12/743,576

(22) PCT Filed: Apr. 27, 2010

(86) PCT No.: PCT/JP2010/003005
§ 371 (c)(1),
(2), (4) Date: May 19, 2010

(87) PCT Pub. No.: WO2011/135612
PCT Pub. Date: Nov. 3, 2011

(65) Prior Publication Data
US 2011/0264855 A1 Oct. 27, 2011

(51) Int. Cl.
*G06F 12/00* (2006.01)
*G06F 13/00* (2006.01)
*G06F 13/28* (2006.01)

(52) U.S. Cl.
USPC .................. 711/165; 711/170; 711/154

(58) Field of Classification Search
USPC ........ 711/165, 162, 114, 170, 154; 714/4.12, 714/6.3, 6.32
See application file for complete search history.

(56) References Cited

U.S. PATENT DOCUMENTS

| | | | |
|---|---|---|---|
| 7,555,601 B2 | 6/2009 | Yamagami | |
| 7,991,952 B2* | 8/2011 | Shiga et al. | 711/114 |
| 2004/0193760 A1* | 9/2004 | Matsunami et al. | 710/36 |
| 2005/0262322 A1* | 11/2005 | Ma | 711/165 |
| 2007/0192560 A1* | 8/2007 | Furuhashi | 711/170 |
| 2008/0229048 A1* | 9/2008 | Murase et al. | 711/171 |

FOREIGN PATENT DOCUMENTS

| | | |
|---|---|---|
| EP | 1 462 927 A2 | 9/2004 |
| EP | 2 104 030 A2 | 9/2009 |

* cited by examiner

*Primary Examiner* — Christian P Chace
*Assistant Examiner* — Rocio Del Mar Perez-Velez
(74) *Attorney, Agent, or Firm* — Mattingly & Malur, PC

(57) ABSTRACT

A storage apparatus 10 implements Thin Provisioning functions by allocating a storage area of a physical drive 171 to a logical page in units of a physical page, the physical drive 171 being managed as a storage pool 93, the logical page being a management unit of a storage area of a virtual volume 52; performs tier arrangement processing to replicate data stored in a migration source physical page to a migration destination physical page; and performs replacement processing for the physical drive 171 upon receipt of a request to replace the physical drive 171 in units of a physical device (PDEV). In performing the replacement processing for the physical drive 171, when a first processing mode is designated as tier arrangement processing mode, the storage apparatus 10 cancels start of the tier arrangement processing, and then starts the replacement processing.

15 Claims, 32 Drawing Sheets

INFORMATION PROCESSING SYSTEM 1

Fig. 11

VOLUME MANAGEMENT TABLE 1100

| VOLUME ID | STORAGE ID | VOLUME TYPE | | STORAGE CAPACITY | POOL ID | ALLOCATION DESTINATION |
|---|---|---|---|---|---|---|
| | | RAID LEVEL | DISK TYPE | | | |
| 00:01 | Storage1 | RAID1 | FC | 10GB | n/a | Host1 |
| 00:02 | Storage1 | RAID1 | FC | 10GB | n/a | Host1 |
| 01:01 | Storage1 | RAID5 | FC | 100GB | n/a | Pool1 |
| 01:02 | Storage1 | RAID5 | FC | 100GB | n/a | Pool1 |
| 01:03 | Storage1 | RAID5 | FC | 100GB | n/a | Pool3 |
| 02:01 | Storage1 | RAID1 | SATA | 25GB | n/a | Pool2 |
| 02:02 | Storage1 | RAID1 | SATA | 25GB | n/a | Pool2 |
| 02:03 | Storage1 | RAID1 | SATA | 25GB | n/a | Pool3 |
| 03:01 | Storage1 | RAID1 | FC | 10GB | n/a | n/a |
| 03:02 | Storage1 | RAID1 | FC | 10GB | n/a | n/a |
| V:00:01 | Storage1 | RAID5 | FC | 100GB | Pool1 | Host2 |
| V:00:02 | Storage1 | RAID5 | FC | 50GB | Pool1 | Host2 |
| V:00:03 | Storage1 | RAID1 | SATA | 20GB | Pool2 | Host3 |
| V:00:04 | Storage1 | RAID1 | SATA | 10GB | Pool2 | n/a |
| V:00:05 | Storage1 | RAID5/RAID1 MIXED | FC/SATA MIXED | 30GB | Pool3 | n/a |
| ... | | | | | | |
| 11:01 | Storage2 | RAID5 | FC | 10GB | n/a | n/a |
| ... | | | | | | |

RECORD (PSCB) STRUCTURE OF PSCB TABLE 1400

- 1411 SECOND TYPE LDEV NUMBER
- 1412 SECOND TYPE LDEV SLOT ADDRESS
- 1413 FIRST TYPE LDEV NUMBER
- 1414 FIRST TYPE LDEV SLOT ADDRESS
- 1415 ALLOCATION STATE
- 1416 PSCB FORWARD POINTER
- 1417 PSCB BACKWARD POINTER

DATA STRUCTURE OF VVOL-DIR 1500

Fig. 16

MODEL NAME INFORMATION TABLE 1600

| MODEL NAME 1611 | TYPE 1612 | I/F 1613 | STORAGE CAPACITY 1614 | rpm 1615 | TRANSFER RATE 1616 |
|---|---|---|---|---|---|
| DKR2G-K72FC | HDD | FC | 72GB | 15000 | 400MB/S |
| DKR2G-K146FC | HDD | FC | 146GB | 15000 | 400MB/S |
| DKR2F-J300FC | HDD | FC | 300GB | 10000 | 200MB/S |
| DKR2G-K300FC | HDD | FC | 300GB | 15000 | 400MB/S |
| DKS2E-J400FC | HDD | FC | 400GB | 10000 | 400MB/S |
| DKS2F-K450FC | HDD | FC | 450GB | 15000 | 400MB/S |
| DKR2B-H0R7AT | HDD | SATA | 750GB | 7200 | 300MB/S |
| DKR2B-H1R0AT | HDD | SATA | 1000GB | 7200 | 300MB/S |
| SDT2A-S072FC | SSD | FC | 72GB | — | 400MB/S |
| SDT2A-S146FC | SSD | FC | 146GB | — | 400MB/S |
| .. | .. | .. | .. | .. | .. |

RECORD STRUCTURE OF LDEV
MANAGEMENT INFORMATION TABLE 1900

Fig. 20

RECORD STRUCTURE OF VDEV MANAGEMENT
INFORMATION TABLE 2000

| | |
|---|---|
| VDEV NUMBER | 2011 |
| EMULATION TYPE | 2012 |
| TOTAL SIZE | 2013 |
| FREE SPACE SIZE | 2014 |
| DEVICE ATTRIBUTE | 2015 |
| DEVICE STATE | 2016 |
| TIER LEVEL | 2017 |
| NUMBER OF SET LDEV | 2018 |
| LDEV NUMBER | 2019 |
| START LDEV SLOT NUMBER | 2020 |
| END LDEV SLOT NUMBER | 2021 |
| LDEV NUMBER | 2019 |
| START LDEV SLOT NUMBER | 2020 |
| END LDEV SLOT NUMBER | 2021 |
| : | |

Fig. 23

POOL MANAGEMENT TABLE 2300

| POOL ID (2311) | NUMBER OF TOTAL PAGES (2312) | NUMBER OF USED PAGES (2313) | LDEV NUMBER LIST (2314) |
|---|---|---|---|
| 1 | 28754632 | 487620 | 30, 2, 14··· |
| 2 | 28754632 | 124578 | 28, 5, 17··· |
| ⋮ | ⋮ | ⋮ | ⋮ |

Fig. 24

PVOL MANAGEMENT TABLE 2400

| LDEV NUMBER (2411) | NUMBER OF TOTAL PAGES (2412) | NUMBER OF USED PAGES (2413) | TIER NUMBER (2414) |
|---|---|---|---|
| 30 | 1964728 | 38792 | 0 |
| 2 | 1964728 | 13478 | 0 |
| ⋮ | ⋮ | ⋮ | ⋮ |

Fig. 25

TIER MANAGEMENT TABLE 2500

| TIER NUMBER (2511) | NUMBER OF TOTAL PAGES (2512) | NUMBER OF USED PAGES (2513) | LDEV NUMBER LIST (2514) |
|---|---|---|---|
| 0 | 2815476 | 81452 | 20, 2··· |
| 1 | 3947395 | 47826 | 4, 6, 7··· |
| ⋮ | ⋮ | ⋮ | ⋮ |

Fig. 26

PSCB QUEUE MANAGEMENT TABLE 2600

| QUEUE NUMBER | FREE QUEUE POINTER | ALLOCATION QUEUE POINTER | LDEV NUMBER | POOL ID | TIER NUMBER |
|---|---|---|---|---|---|
| 0 | AAAAA# | CCCCC# | 30 | 1 | 0 |
| 1 | BBBBB# | DDDDD# | 40 | 2 | 2 |
| : | : | : | : | : | : |

Fig. 27

DATA REPLICATION PROGRESS MANAGEMENT TABLE 2700

| LDEV NUMBER | NUMBER OF REPLICATED SLOTS | NUMBER OF SLOTS TO BE REPLICATED |
|---|---|---|
| 2 | 16 | 7021532 |
| 3 | 225 | 3767828 |
| : | : | : |

Fig. 28

PAGE PERFORMANCE INFORMATION TABLE 2800

| PHYSICAL PAGE ID | ACCESS FREQUENCY | |
|---|---|---|
| | READ TIMES | WRITE TIMES |
| P-PAGE1 | 45752 | 2445 |
| P-PAGE2 | 45687 | 3454 |
| : | : | : |

Fig. 36

INTER-TIER MIGRATION REQUIREMENT CONDITION TABLE 3600

| TIER OF CURRENT LOGICAL PAGE (3611) | CONDITION FOR MIGRATION TO HIGHER TIER (MIGRATE TO NEXT HIGHER TIER IF FOLLOWING CONDITION IS SATISFIED) (3612) ACCESS TIMES PER LOGICAL PAGE | CONDITION FOR MIGRATION TO LOWER TIER (MIGRATE TO NEXT LOWER TIER IF FOLLOWING CONDITION IS SATISFIED) (3613) ACCESS TIMES PER LOGICAL PAGE |
|---|---|---|
| Tier1 | (NONE) | 10 TIMES OR LESS |
| Tier2 | 20 TIMES OR MORE | 5 TIMES OR LESS |
| Tier3 | 10 TIMES OR MORE | (NONE) |
| ... | ... | ... |

Fig. 37

MIGRATION OBJECT LOGICAL PAGE MANAGEMENT QUEUE 3700

| LOGICAL PAGE ID (3711) | TIER OF MIGRATION SOURCE (3712) | TIER OF MIGRATION DESTINATION (3713) |
|---|---|---|
| L-PAGE0101 | TIER1 | TIER2 |
| L-PAGE0102 | TIER1 | TIER2 |
| L-PAGE0103 | TIER1 | TIER2 |
| L-PAGE0201 | TIER2 | TIER1 |
| L-PAGE0202 | TIER2 | TIER1 |
| L-PAGE0301 | TIER3 | TIER2 |
| L-PAGE0302 | TIER3 | TIER2 |
| ... | ... | ... |

US 8,521,978 B2

STORAGE APPARATUS AND METHOD FOR CONTROLLING STORAGE APPARATUS

TECHNICAL FIELD

The present invention relates to a storage apparatus and a method for controlling the storage apparatus, and in particular to a technique to replace physical resources included in a storage pool in Thin Provisioning while achieving an appropriate operation of the storage apparatus.

BACKGROUND ART

So-called Thin Provisioning is known as a technique to achieve a reduction of TCO (Total Cost of Ownership). In Thin Provisioning, real storage resources expected to be used in the future are not introduced beforehand, unlike the conventional storage systems. Specifically, storage resources supplied by a physical drive such as a hard disk drive are managed as a storage pool; virtual volumes configured by using real storage resources of storage pools are provided to a server apparatus (an external device); and when real storage resources become in short supply, a necessary amount of real storage resources is supplied to the storage pools as supplementary resources. According to Thin Provisioning, various advantages may be obtained such as facilitated capacity design of the storage system, reduction of initial introduction costs, reduction of operational costs such as electric power and air conditioning costs.

As a method of controlling storage resources virtually, for example, Patent Literature (PTL) 1 describes a configuration of a storage control system. In the storage control system, upon receipt of a read or write request from a higher level apparatus which is aware of a virtual storage unit, a virtual storage area in the virtual storage unit is associated with a logical storage area in a logical storage device, and data are exchanged between the logical storage area and the higher level apparatus via the virtual storage areas.

CITATION LIST

Patent Literature

PTL 1: U.S. Pat. No. 7,555,601

SUMMARY OF INVENTION

Technical Problem

Since the service life of a physical drive such as a hard disk is limited, replacement of the physical drive which is included in the storage pools is indispensable in order to safely continue to operate the storage system. However, when the storage system is supposed to operate round-the-clock in a facility such as a data center, the storage system is not allowed to halt the operation to replace a physical drive, but also needs to be prevented from causing an adverse effect on business operations due to reduced performance. In addition, it is necessary to flexibly meet the needs that replacement of a physical drive should be given higher priority.

The present invention has made in view of such background, and it is an object thereof to provide a storage system and a method for controlling the storage system which are capable of replacing physical resources included in storage pools in Thin Provisioning while achieving an appropriate operation of the storage system.

Solution To Problem

One of the present invention for achieving the object is a storage apparatus including: an I/O processing part which writes data to a physical drive or reads data from the physical drive in response to a data write request or a data read request transmitted from an external device; a storage area management part which implements a Thin Provisioning function by providing the external device with a storage area of the physical drive in units of a virtual volume which is a logical storage area, and by allocating a storage area of the physical drive managed as a storage pool to a logical page in units of a physical page that is a management unit of the storage area of the physical drive, the logical page being a management unit of a storage area of the virtual volume; a tier arrangement processing part which classifies the physical drive into tiers, which manages an access frequency of each of the logical pages, and which, when the access frequency of the logical page satisfies a predefined condition, allocates a migration destination physical page that is the physical page belonging to a tier different from a tier to which a migration source physical page that is the physical page currently allocated to the logical page belongs, and performs tier arrangement processing to replicate data stored in the migration source physical page to the migration destination physical page; and a replacement processing part which receives a request to replace the physical drive in units of a physical device that is a physical storage device including a storage area of the physical drive, and performs replacement processing for the physical drive by replicating data stored in the physical device of a replacement source to the physical device of a replacement destination, and by reallocating a storage area of the physical device of the replacement source to the storage area of the virtual volume. The storage apparatus stores a designation of a tier arrangement processing mode which is a processing mode of the tier arrangement processing. In performing the replacement processing, when a first processing mode is designated as the tier arrangement processing mode, the replacement processing part cancels start of the tier arrangement processing, and starts the replacement processing.

The object and the means for solving the problems disclosed by this patent application will be made apparent by the description in Embodiments of Invention, and illustrations of the drawings.

Advantageous Effects of Invention

According to the present invention, it is possible to replace physical resources included in a storage pool in Thin Provisioning while achieving an appropriate operation of the storage apparatus.

BRIEF DESCRIPTION OF DRAWINGS

FIG. 11 is a table showing an example of a volume management table 1100

FIG. 16 is a diagram showing a model name information table 1600.

FIG. 20 is a diagram showing a record structure of a VDEV management information table 2000.

FIG. 23 is a diagram showing a pool management table 2300.

FIG. 24 is a diagram showing a PVOL management table 2400.

FIG. 25 is a diagram showing a Tier management table 2500.

FIG. 26 is a diagram showing a PSCB queue management table 2600.

FIG. 27 is a diagram showing a data replication progress management table 2700.

FIG. 28 is a diagram showing a page performance information table 2800.

FIG. 36 is a diagram showing an inter-tier migration requirement condition table 3600.

FIG. 37 is a diagram showing a migration object logical page management queue 3700.

DESCRIPTION OF EMBODIMENTS

Figure 1:
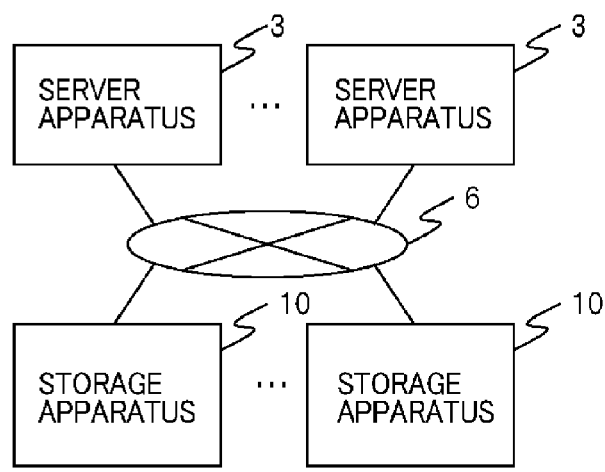
FIG. 1 is a schematic diagram showing a configuration of a storage system 1.

Hereinbelow, an embodiment is described with reference to the drawings. FIG. 1 shows a schematic configuration of the information processing system 1 described as an embodiment. As shown in the figure, an information processing system 1 includes one or more server apparatuses 3 (external apparatuses), and one or more storage apparatuses 10. The server apparatuses 3 and the storage apparatuses 10 are communicably coupled via a storage network 6.

The storage network 6 is a LAN (Local Area Network), WAN (Wide Area Network), SAN (Storage Area Network), the Internet, a public telecommunication network, a private line, and the like. Communication via the storage network 6 is performed in accordance with a protocol of, for example, TCP/IP, iSCSI (internet Small Computer System Interface), the Fibre Channel Protocol, FCoE (Fibre Channel over Ethernet), FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like.

Each server apparatus 3 is an information processing apparatus (computer) utilizing storage areas (data storage areas) provided by the storage apparatuses 10. The server apparatus 3 includes a personal computer, a Mainframe, an office computer, or the like. The server apparatus 3, for accessing the above-mentioned storage area, transmits a data frame (hereinafter abbreviated to a frame) including a data I/O request (data write request, data read request, and the like) to a corresponding one of the storage apparatuses 10.

Figure 2:
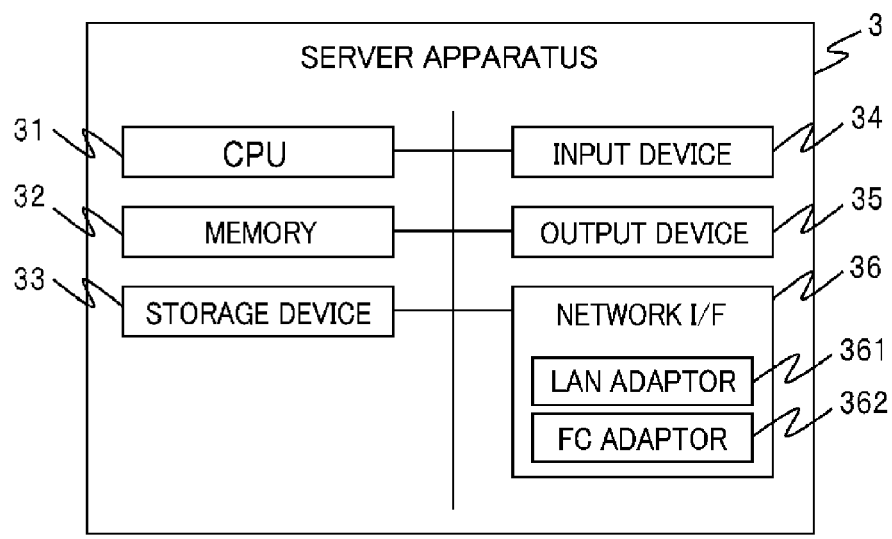
FIG. 2 is a diagram showing a hardware configuration of a server apparatus 3.

FIG. 2 shows an example of hardware of an information processing apparatus (computer) which can be utilized as a server apparatus 3. As shown in the figure, this device includes a CPU 31, a volatile or non-volatile memory 32 (RAM or ROM), a storage device 33 (e.g., a hard disk drive (HDD) or a semiconductor storage device (SSD)), an input device 34 such as a keyboard or a mouse, an output device 35 such as a liquid crystal display or a printer, and a network interface (hereinafter referred to as a network I/F 36) such as an NIC (hereinafter referred to as a LAN adapter 361) or an HBA (hereinafter referred to as an FC adapter 362).

Figure 3:
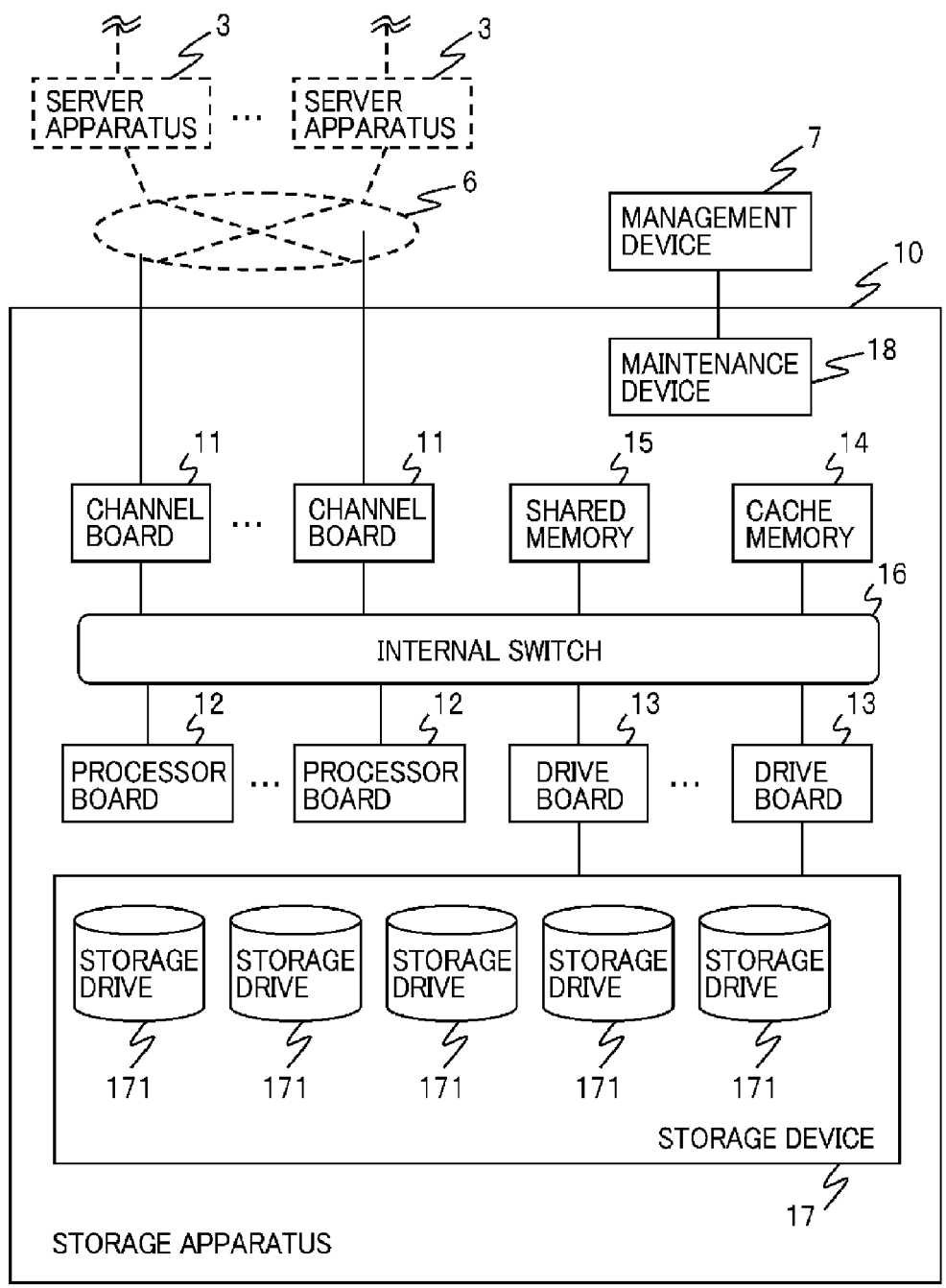
FIG. 3 is a diagram showing a hardware configuration of a storage apparatus 10.

FIG. 3 shows an example of the hardware configuration of the storage apparatus 10. The storage apparatus 10 is, for example, a disk array apparatus. The storage apparatus 10 accesses a recording medium in response to the above-mentioned I/O request transmitted from the server apparatus 3 via the storage network 6, and transmits data or a response to the server apparatus 3. As shown in the figure, this storage apparatus 10 includes one or more channel boards 11, one or more processor boards 12 (micro processors), one or more drive boards 13, a cache memory 14, a shared memory 15, an internal switch 16, a storage device 17, and a maintenance device 18 (SVP: SerVice Processor). The channel boards 11, the processor boards 12, the drive boards 13, the cache memory 14, and the shared memory 15 are communicably coupled to one another via the internal switch 16.

The channel board 11 receives a frame transmitted from the server apparatus 3, and transmits a frame including a response corresponding to the processing for the data I/O request included in the received frame (e.g., the data which has been read, a read completion report, or a write completion report) to the server apparatus 3. Note that the description below assumes the frame to be a Fibre Channel frame (FC frame)

The processor board 12 performs processing relating to data transfer between the channel board 11, the drive board 13, and the cache memory 14, in response to the above-mentioned data I/O request included in the frame received by the channel board 11. The processor board 12 performs: delivery of data (data read from the storage device 17, data to be written to the storage device 17) between the channel board 11 and the drive board 13 via the cache memory 14; staging (reading data from the storage device 17); destaging (writing data to the storage device 17) of data stored in the cache memory 14; and the like.

The cache memory 14 includes a RAM (Random Access Memory) capable of high-speed access. The cache memory 14 stores therein data to be written to the storage device 17 (hereinafter referred to as write data), data read from the storage device 17 (hereinafter referred to as read data) and the like. The shared memory 15 stores therein various types of information used for controlling the storage apparatus 10.

The drive board 13 communicates with the storage device 17 when reading data from the storage device 17 and writing data to the storage device 17. The internal switch 16 includes, for example, a high-speed crossbar switch. Communication via the internal switch 16 is performed in accordance with a protocol such as a Fibre Channel protocol, iSCSI, TCP/IP, and the like.

The storage device 17 includes multiple physical drives 171 which are physical storage media. The physical drives 171 include a hard disk drive such as the type of SAS (Serial Attached SCSI), SATA (Serial ATA), FC (Fibre Channel), PATA (Parallel ATA), SCSI or the like; or hardware such as a semiconductor storage device (SSD). The storage device 17 may be stored in the same housing as the storage apparatus 10 is stored, or may be stored in a separate housing.

Figure 4:
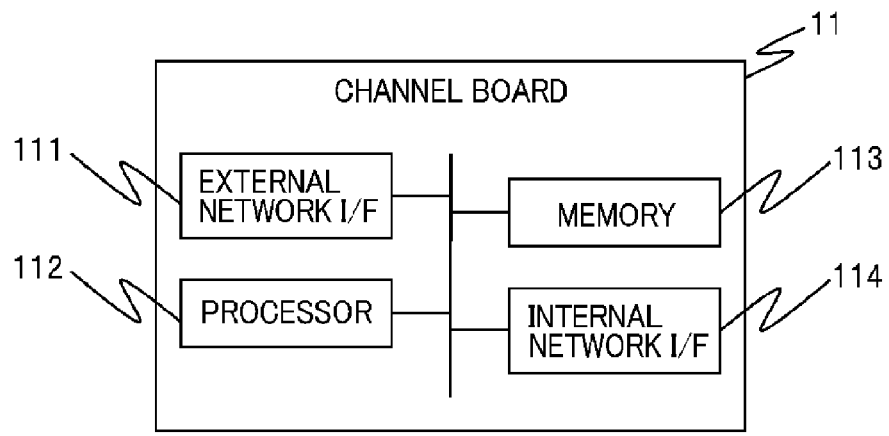
FIG. 4 is a diagram showing a hardware configuration of a channel board 11.

FIG. 4 shows a hardware configuration of the channel board 11. As shown in the figure, the channel board 11 includes an external network interface (hereinafter referred to as an external network I/F 111) having a port (communication port) for communication with the server apparatus 3, a processor 112 (including a frame processing chip and a frame transfer chip to be described later), a memory 113, an internal network interface (hereinafter referred to as an internal network I/F 114) having a port (communication port) for communication with the processor board 12.

The external network I/F 111 includes an NIC (Network Interface Card), an HBA (Host Bus Adapter), or the like. The processor 112 includes a CPU (Central Processing Unit), an MPU (Micro Processing Unit), and the like. The memory 113 is a RAM (Random Access Memory) or a ROM (Read Only Memory). The memory 113 stores therein a microprogram. The processor 112 reads and executes the above-mentioned microprogram from the memory 113, thereby implementing various types of functions provided by the channel board 11. The internal network I/F 114 communicates with the processor board 12, the drive board 13, the cache memory 14, and the shared memory 15 via the internal switch 16.

Figure 5:
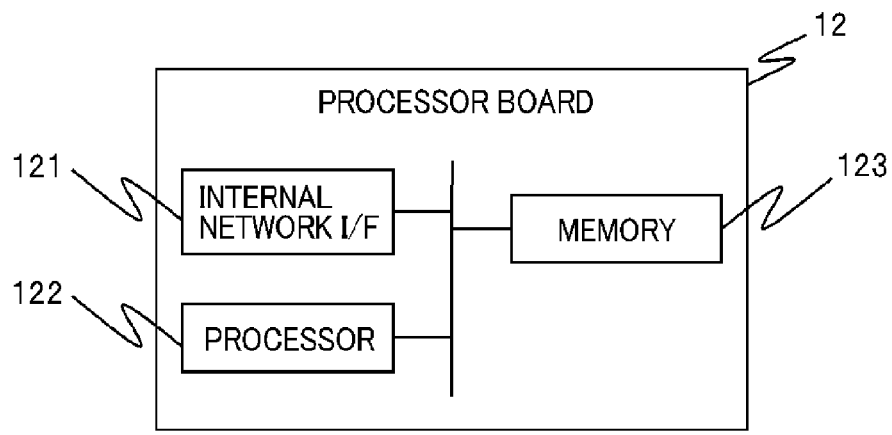
FIG. 5 is a diagram showing a hardware configuration of a processor board 12.

FIG. 5 shows a hardware configuration of the processor board 12. The processor board 12 includes an internal network interface (hereinafter referred to as an internal network I/F 121), a processor 122, and a memory 123 (local memory) with a higher performance in accessing from the processor 122 (i.e. capable of high-speed access) than the shared memory 15. The memory 123 stores therein a microprogram. The processor 122 reads and executes the above-mentioned microprogram from the memory 123, thereby implementing various functions provided by the processor board 12.

The internal network I/F 121 communicates with the channel board 11, the drive board 13, the cache memory 14, and the shared memory 15 via the internal switch 16. The processor 122 includes a CPU, an MPU, DMA (Direct Memory Access), or the like. The memory 123 is a RAM or a ROM. The processor 122 can access both the memory 123 and the shared memory 15.

Figure 6:
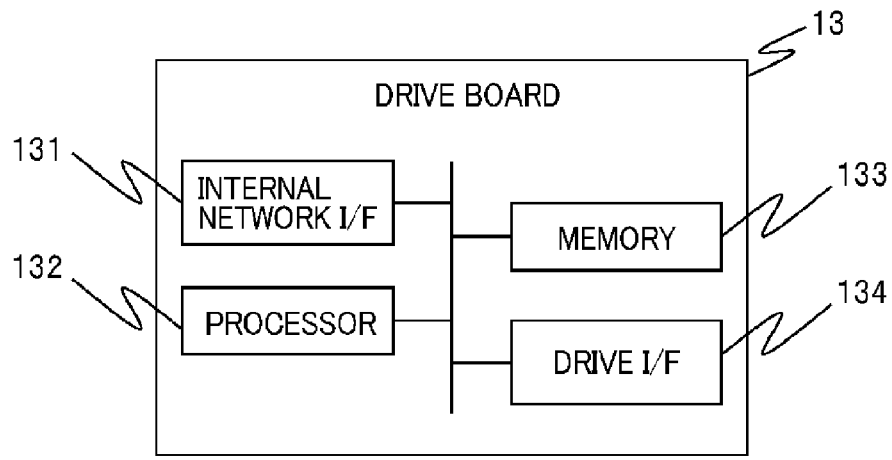
FIG. 6 is a diagram showing a hardware configuration of a drive board 13.

FIG. 6 shows a hardware configuration of the drive board 13. The drive board 13 includes an internal network interface (hereinafter referred to as an internal network I/F 131), a processor 132, a memory 133, and a drive interface (hereinafter referred to as a drive I/F 134). The memory 133 stores therein a microprogram. The processor 132 reads and executes the above-mentioned microprogram from the memory 133, thereby implementing various functions provided by the drive board 13. The internal network I/F 131 communicates with the channel board 11, the processor board 12, the cache memory 14, and the shared memory 15 via the internal switch 16. The processor 132 includes a CPU, an MPU, or the like. The memory 133 is, for example, a RAM or a ROM. The drive I/F 134 communicates with the storage device 17.

The maintenance device 18 shown in FIG. 3 controls the components of the storage apparatus 10 and monitors the states of the components. The maintenance device 18 is a personal computer, an office computer, or the like. The maintenance device 18, via the internal switch 16 or communication means such as LAN, communicates as needed with the components of the storage apparatus 10 such as the channel board 11, the processor board 12, the drive board 13, the cache memory 14, the shared memory 15, and the internal switch 16, thereby acquires operation information and the like from the components, and provides the information and the like to a management device 7. Furthermore, the maintenance device 18, sets, controls, and maintains the components (including installing and updating software) based on control information and operation information transmitted from the management device 7.

The management device 7 is a computer communicably coupled to the maintenance device 18 via a LAN or the like. The management device 7 includes a user interface that uses a GUI (Graphic User Interface), CLI (Command Line Interface), and the like to control and monitor the storage apparatus 10.

Figure 7:
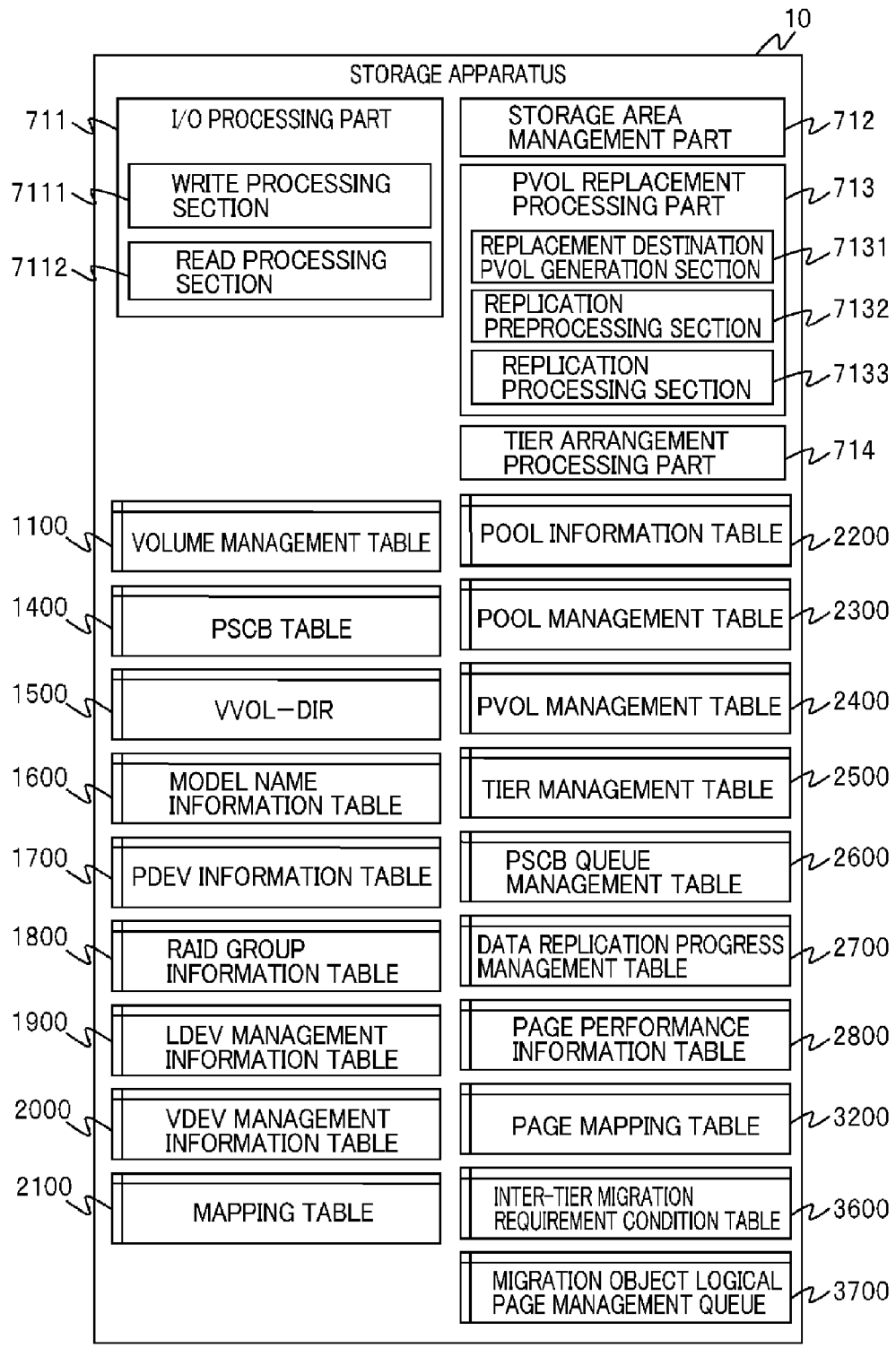
FIG. 7 is a diagram showing main functions provided for the storage apparatus 10 and main data managed by the storage apparatus 10.

FIG. 7 shows the main functions related to implementation of the services provided by the storage apparatus 10 to the server apparatus 3. As shown in the figure, the storage apparatus 10 includes an I/O processing part 711 and a storage area management part 712, and a tier arrangement processing part 714. The I/O processing part 711 includes a data write processing section 7111 that performs processing related to writing to the storage device 17 and a data read processing section 7112 that performs processing related to reading of data from the storage device 17. The storage area management part 712 manages data related to the physical drives 171 and logical units 91 to be described later. The tier arrangement processing part 714 performs processing related to data migration between tiers of the physical drives 171, which are described later.

Note that the functions of the storage apparatus 10 are implemented by the hardware provided in the channel board 11, the processor board 12, and the drive board 13 of the storage apparatus 10, or by the processors 112, 122, and 132 reading and executing the microprograms stored in the memories 113, 123, and 133

As shown in FIG. 7, the storage apparatus 10 manages (stores) a volume management table 1100, a PSCB table 1400, a VVOL-DIR 1500, a model name information table 1600, a PDEV information table 1700, a RAID group information table 1800, a LDEV management information table 1900, a VDEV management information table 2000, a mapping table 2100, a pool information table 2200, a pool management table 2300, a PVOL management table 2400, a tier management table 2500, a PSCB queue management table 2600, a data replication progress management table 2700, a page performance information table 2800, a page mapping table 3200, an inter-tier migration requirement condition table 3600, and a migration object logical page management queue 3700.

The storage apparatus 10 stores these tables, for example, in the shared memory 15, the memory 123 of the processor board 12, and the like. Note that these tables can be normalized as needed. In addition, structures of these tables can be changed to redundant ones as needed for the purpose of improving the access performance to the tables.

Figure 8:
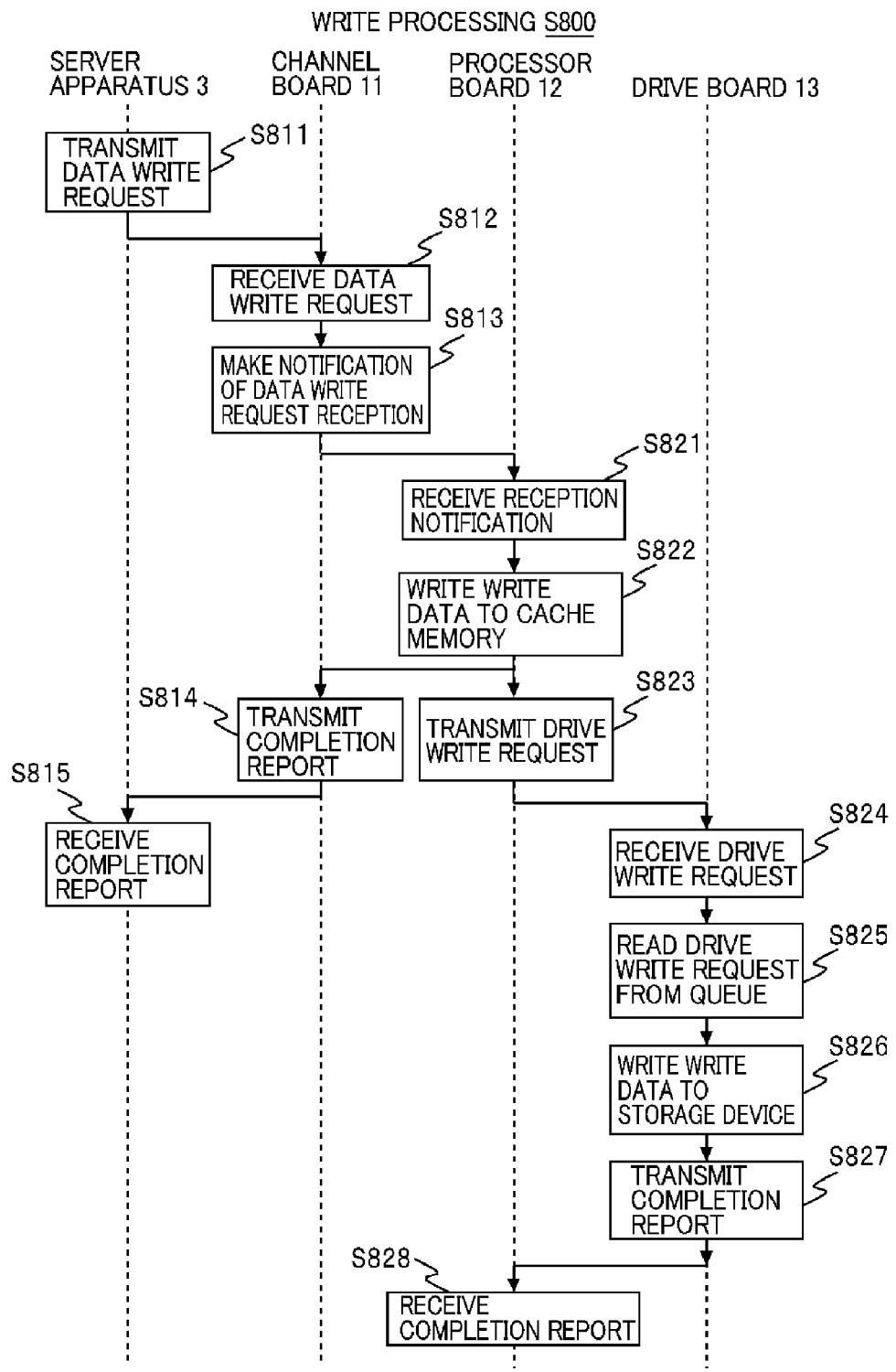
FIG. 8 is a flowchart explaining data write processing S800.

FIG. 8 is a flowchart explaining basic processing performed by the data write processing section 7111 of the I/O processing part 711 in a case that the storage apparatus 10 receives a frame including a data write request from the server apparatus 3 (hereinafter referred to as write processing S800). The data write processing S800 is described below with reference to FIG. 8. Note that, in the description below, a letter "S" prefixed to each reference numeral indicates a step.

The frame transmitted from the server apparatus 3 is received by the channel board 11 in the storage apparatus 10 (S811, S812). When receiving the frame, the channel board 11 notifies the processor board 12 (S813) to that effect.

When receiving the above-mentioned notification from the channel board 11 (S821), the processor board 12 generates a drive write request based on the data write request of the frame, and stores the generated drive write request and write data in the cache memory 14. Then, the processor board 12 transmits the generated drive write request to the drive board 13 (S822, S823). The channel board 11 transmits a completion report to the server apparatus 3 (S814), and the server apparatus 3 receives the completion report (S815).

When receiving the drive write request, the drive board 13 registers the drive write request to the write processing queue (S824). The drive board 13 reads the drive write request from the write processing queue as needed (S825). The drive board 13 reads the write data specified by the read drive write request from the cache memory 14, and writes the read write data to a corresponding physical drive 171 (S826).

Then the drive board 13 notifies the processor board 12 (S827) of the report (completion report) that write of the write data has been completed in response to the drive write request, and the processor board 12 receives the transmitted completion report (S828).

Figure 9:
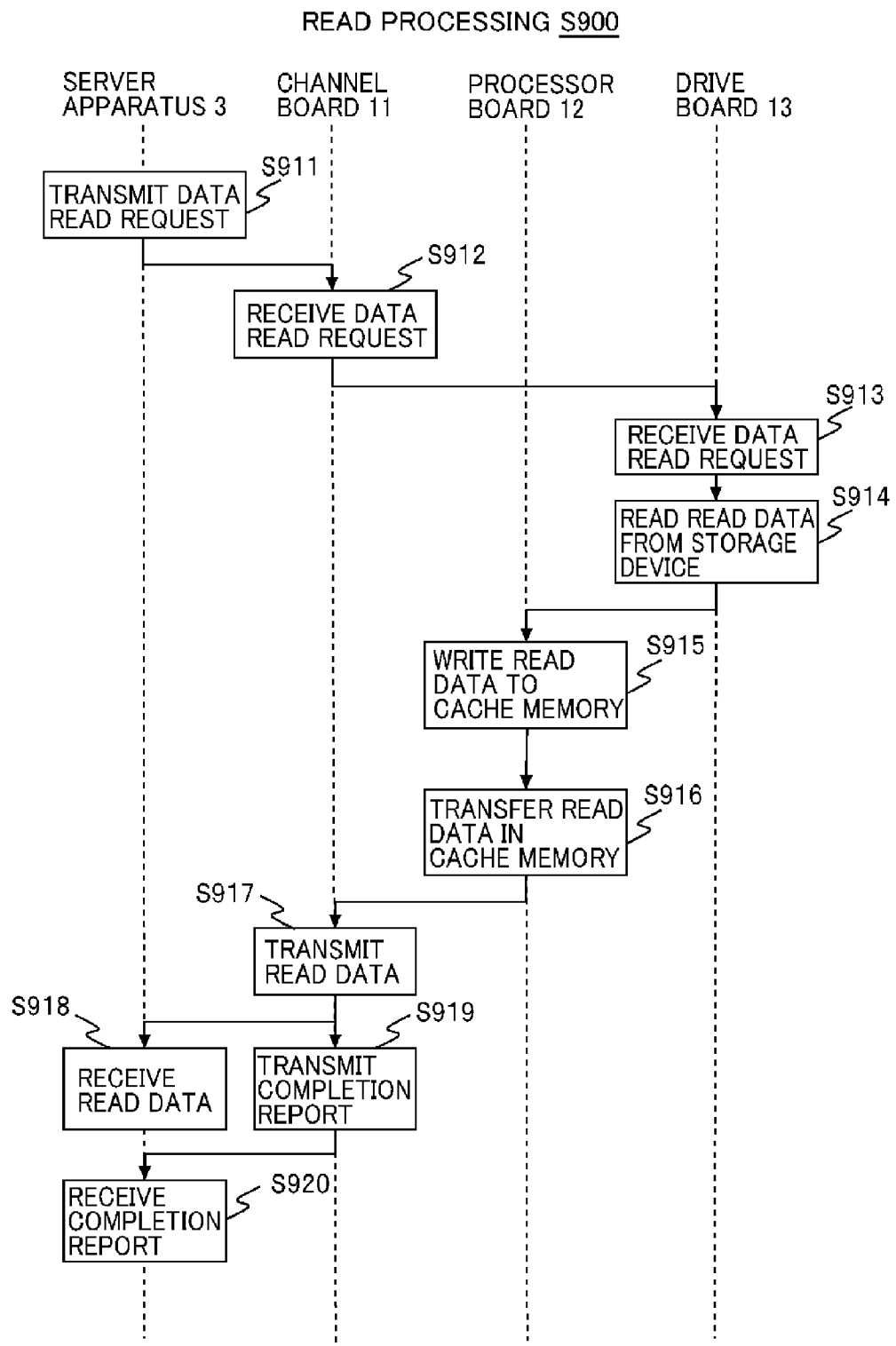
FIG. 9 is a flowchart explaining data read processing S900.

FIG. 9 is a flowchart explaining I/O processing performed by the read processing section 4512 in the I/O processing part 711 of the storage apparatus 10 in a case that the storage apparatus 10 receives a frame including a data read request from the server apparatus 3 (hereinafter referred to as read processing S900). The read processing S900 is described below with reference to FIG. 9.

The frame transmitted from the server apparatus 3 is received by the channel board 11 in the storage apparatus 10 (S911, S912). When receiving the frame from the server apparatus 3, the channel board 11 notifies the processor board 12 and the drive board 13 to that effect.

When receiving the above-mentioned notification from the channel board 11 (S913), the drive board 13 reads the data specified by the data read request included in the frame (e.g., specified by an LBA (Logical Block Address)) from the storage device 17 (the physical drive 171) (S914). Note that, if there is any read data in the cache memory 14 (in a case of a cache hit), the read processing from the storage device 17 (S914, S915) is omitted. The processor board 12 writes the data which is read by the drive board 13, to the cache memory 14 (S915). The processor board 12 transfers the data which has been written to the cache memory 14, to the channel board 11 as needed (S916).

The channel board 11 sequentially transmits the read data which has been transmitted from the processor board 12, to the server apparatus 3 (S917, S918). When the transmission of the read data is completed, the channel board 11 transmits a completion report to the server apparatus 3 (S919), and the server apparatus 3 receives the transmitted completion report (S920).

The storage apparatus 10 provides the server apparatus 4 with storage areas of the physical drive 171 in units of a logical unit 91 (LU) which is a logical storage area configured by allocating a predetermined allocation unit (hereinafter referred to as a physical page) to a storage area of the physical drive 171. The physical drive 171 may be implemented as a storage area provided by controlling, for example, multiple pieces of hardware (hard disk drives) with a scheme such as RAID (Redundant Arrays of Inexpensive (or Independent) Disks). In the description below, the physical drive 171 is assumed to be a storage area provided by controlling multiple pieces of hardware with RAID.

Figure 10:
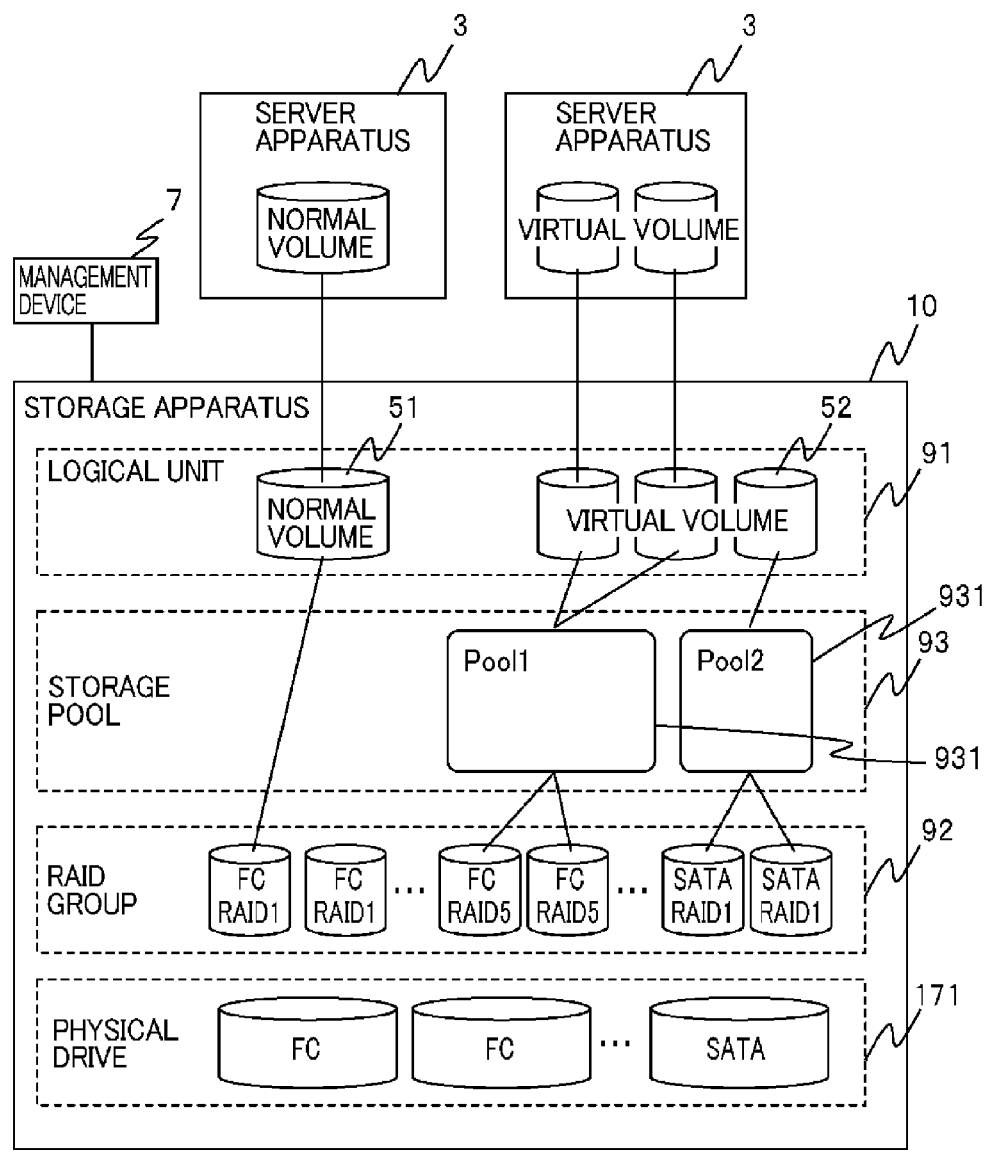
FIG. 10 is a diagram explaining a supply mode of storage resources from the storage apparatus 10 to the server apparatus 3.

FIG. 10 is a diagram explaining a mode of supplying storage resources from the storage apparatus 10 to the server apparatus 3 in Thin Provisioning function provided to the storage apparatus 10. The storage apparatus 10 provides the logical units 91 to the server apparatus 3. The server apparatus 3 can access storage resources in the storage apparatus 10 by designating an LUN (Logical Unit Number) which is an identifier of a corresponding one of the logical units 91.

In the storage apparatus 10, RAID groups 92 are formed by the physical drives 171. The management device 7 and the storage apparatus 10 assign an identifier to each of the RAID group 92, and manages the attributes of each RAID (for example, the level of the RAID, the type or model number of the interface of the physical drive 171 included in the RAID group 92, and the configuration, performance and reliability of each RAID group 92).

The logical units provided by the storage apparatus 10 to the server apparatus 3 include a normal volume (hereinafter referred to as a NVOL 51) which is a logical unit directly allocated to the RAID group 92, and a virtual volume (hereinafter referred to as a VVOL 52) which is a logical unit indirectly provided as a storage resource to the RAID group 92 via a storage pool 93. The RAID group 92 is statically allocated to the NVOL 51, but is dynamically allocated to the VVOL 52 via the storage pool 93.

In Thin Provisioning, the VVOL 52 having any capacity and attribute can be set for the server apparatus 3 independently of the capacity and attribute of a storage resource that can be currently provided by the storage apparatus 10. If Thin Provisioning is employed, it is possible to achieve such flexible operational mode that, when capacity expansion or an improved performance is actually needed due to a change in the use of a storage area or a new need, a storage resource with the quantity and quality according to the need can be provided. According to Thin Provisioning, it is possible to easily design the information processing system 1 and a data center, and to improve operation efficiency of the information processing system 1, such as a reduction of initial cost to introduce the information processing system 1, prompt supply of a cutting-edge machine, a reduction of operational cost for driving power, cooling equipment or the like.

In response to a request from the management device 7, the storage apparatus 10 creates a VVOL 52 using a certain storage pool 93 as a source storage. The storage apparatus 10 also allocates a VVOL 52 to the server apparatus 3 in response to the request from the management device 7. Note that information (an identifier) is assigned to the VVOL 52 for the server apparatus 3 to identify the VVOL 52 when the server apparatus 3 accesses the VVOL 52. When writing in an address in a VVOL 52 occurs, to which no RAID group 92 has been allocated, the storage apparatus 10 newly allocates a part of the storage areas of the RAID group 92 for the address.

FIG. 11 shows an example of the volume management table 1100. The volume management table 1100 manages information related to the logical units 91 (NVOL 51 and VVOL 52). As shown in the figure, the volume management table 1100 has multiple records each having fields of a volume ID 1011, an storage ID 1012, a volume type 1013, a storage capacity 1014, a pool ID 1015, and an allocation destination 1016.

The volume ID 1011 is set with an identifier (hereinafter referred to as a volume ID) to identify a NVOL 51 or a VVOL 52. In the case that the record is for a NVOL 51, the volume ID 1011 is set with a normal LUN, which is to be assigned to each normal volume, while in the case that the record is for a VVOL 52, the volume ID 1011 is set with a virtual LUN, which is to be assigned to each VVOL 52.

The storage ID 1012 is set with an identifier for the storage apparatus 10 that manages the NVOL 51 or the VVOL 52. As the storage ID, a combination of, for example, an identifier registered by a user, the model number and model name of the storage apparatus 10, and the IP address assigned to the storage apparatus 10 is used.

The volume type 1013 includes both fields of a RAID level 10131 and a disk type 10132. The RAID level 10131 is set with the RAID level of the physical drive 171 forming the NVOL 51 or the VVOL 52. In the case of the VVOL 52, the RAID level 10131 is set with the RAID level of the RAID group 92 forming the storage pool 93 which is a supply source of the VVOL 52.

The disk type 10132 is set with information indicating the type of the physical drive 171 that provides a storage area for the NVOL 51 or the VVOL 52. In the case of the NVOL 51, information indicating the type of the physical drive 171 forming the NVOL 51 is set, while in the case of the VVOL 52, the type of the physical drive 171 forming the storage pool 93 which supplies the VVOL 52 with a storage area.

The storage capacity 1014 is set with the storage capacity of the NVOL 51 or the VVOL 52. In the case of the NVOL 51, the storage capacity thereof is set. In the case of the VVOL 52, the most possible storage capacity which is allocated to the VVOL 52 from the storage pool 93 is set.

If the record is for the VVOL 52, the pool ID 1015 is set with an identifier (hereinafter referred to as a pool ID) of the storage pool 93 to which the VVOL 52 belongs. Note that if the record is for the NVOL 51, the field of the pool ID 1015 is set with a non-applicable value such as "n/a."

The allocation destination 1016 is set with information indicating the allocation destination of the NVOL 51 or the VVOL 52. In the case of the VVOL 52, an identifier of the server apparatus 3 (hereinafter referred to as a host ID) which is the allocation destination of the VVOL 52 is set in the allocation destination 1016. In the case of the NVOL 51, the host ID of the server apparatus 3 of the allocation destination of the NVOL 51, or the pool ID of the storage pool 93 which uses the NVOL 51 is set in the allocation destination 1016. In a case where a logical unit 91 has not been allocated, the allocation destination 1016 is set with a non-applicable value such as "n/a."

Figure 12:
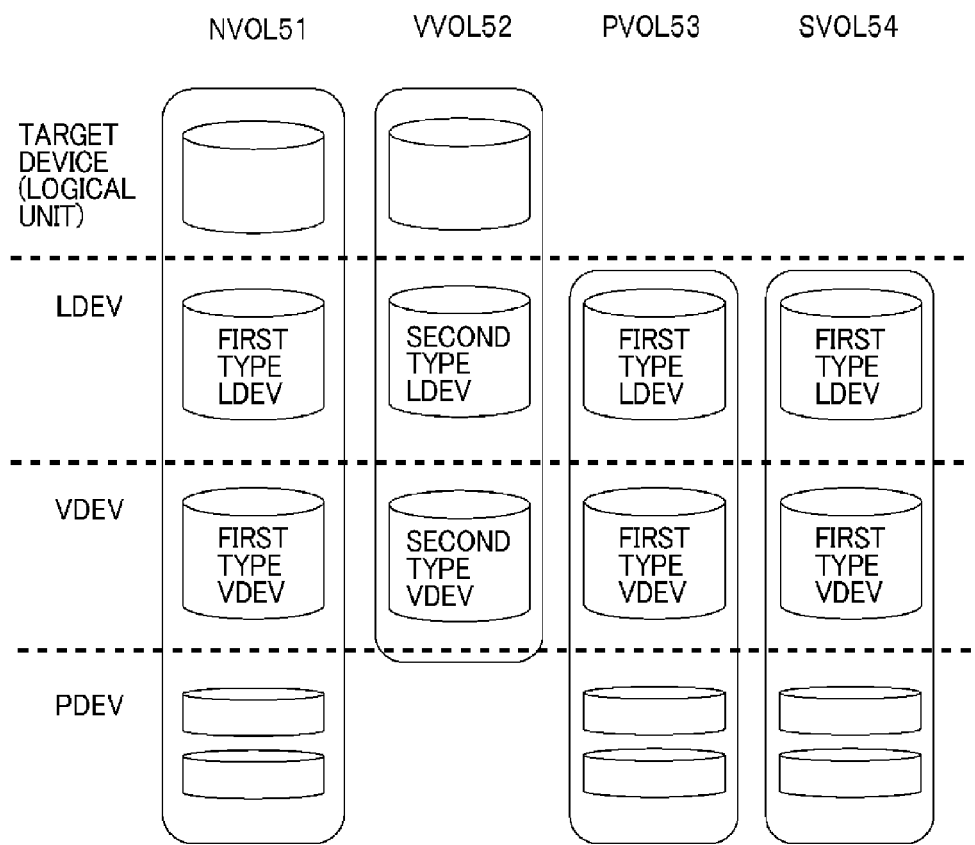
FIG. 12 is a diagram showing a correspondence between storage areas managed in the storage apparatus 10.

The storage apparatus 10 manages the storage areas of the physical drive 171 in various management units. FIG. 12 shows a correspondence between the storage areas managed in the storage apparatus 10 of the present embodiment.

A PDEV (Physical DEVice) is a physical storage device (physical device) which includes storage areas of a RAID group including the physical drive 171. The PDEV may include a storage area provided by another storage apparatus 10 which is externally connected to the originally connected storage apparatus 10 (e.g., an older type storage apparatus or lower performance storage apparatus than the originally connected storage apparatus 10).

A first type VDEV (Virtual DEVice) is a storage device which includes the storage area of the PDEV. A first type LDEV (Logical DEVice) is a storage device formed by using the PDEV. Each storage area of the first type LDEV is associated with a storage area of the first type VDEV. The NVOL 51 is a volume formed by using the first type LDEV.

A pool volume (hereinafter referred to as a PVOL 53) is a volume forming a pool 931 included in the storage pool 93. The PVOL 53 is configured by using the first type LDEV.

The VVOL 52 is a volume which is configured by using the PVOL 53. A storage area of the PVOL 53 is allocated to the VVOL 52 in units of a second type LDEV which is a storage device which is configured by using the first type LDEV. The second type LDEV is associated with a second type VDEV which is a storage device formed by a storage area of the first type LDEV.

A spare volume (hereinafter referred to as a SVOL 54) is a reserve volume that can be replaced with a currently used PVOL 53. The storage area of the SVOL 54 is configured by the first type LDEV.

Figure 13:
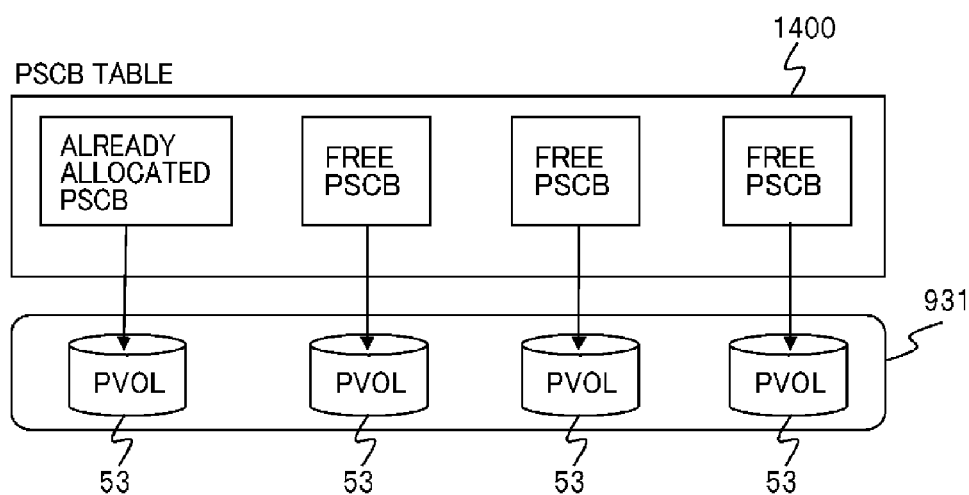
FIG. 13 is a diagram explaining a PSCB and a PSCB table 1400.

The storage apparatus 10 manages storage areas provided by the pools 931 in management units of a predetermined size (hereinafter referred to as a first slot). The storage apparatus 10 manages information (an attribute) of the first slot as a PSCB (Pool Slot Control Block). As shown in FIG. 13, the storage apparatus 10 manages individual PSCBs by using a PSCB table. The PSCB table includes multiple records (PSCB) linked together in a list form.

Figure 14:
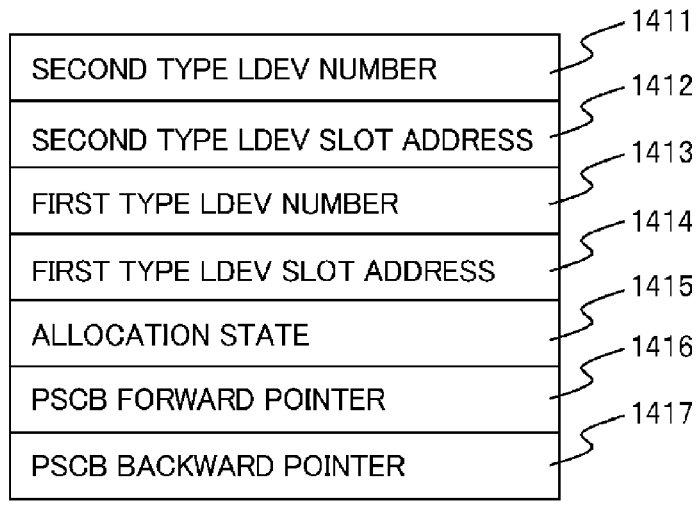
FIG. 14 is a diagram showing a structure of a record (PSCB) of the PSCB table 1400.

FIG. 14 shows the structure of a record of the PSCB table 1400. As shown in the figure, PCSB includes fields of a second type LDEV number 1411, a second type LDEV slot address 1412, a first type LDEV number 1413, a first type LDEV slot address 1414, an allocation state 1415, a PSCB forward pointer 1416, and a PSCB backward pointer 1417.

The second type LDEV number 1411 is set with the number of the second type LDEV forming the VVOL 52 to which a first slot corresponding to the PSCB is allocated. The second type LDEV slot address 1412 is set with an address of a slot of the second type LDEV (hereinafter referred to as a second slot) forming the VVOL 52 to which the first slot corresponding to the PSCB is allocated. Note that the second slot is a management unit of the storage area of the second type LDEV. In addition, the data size of the second slot is the same as that of the first slot.

The first type LDEV number 1413 is set with the number of the first type LDEV forming the PVOL 53 to which the first slot corresponding to the PSCB is allocated. The first type LDEV slot address 1414 is set with an address of the first slot of the first type LDEV forming the PVOL 53 to which the PSCB is allocated. The allocation state 1415 is set with information indicating whether or not the first slot corresponding to the PSCB is allocated to a VVOL 52. The PSCB forward pointer 1416 is set with an address (storage location) at which another PSCB forward-linked to the PSCB is stored. The PSCB backward pointer 1417 is set with an address (storage location) at which another PSCB backward-linked to the PSCB is stored.

The storage apparatus 10 manages (stores) a correspondence between the second type LDEV, the PVOL 53, and the PSCB which form a VVOL 52 as a VVOL-DIR 1500.

Figure 15:
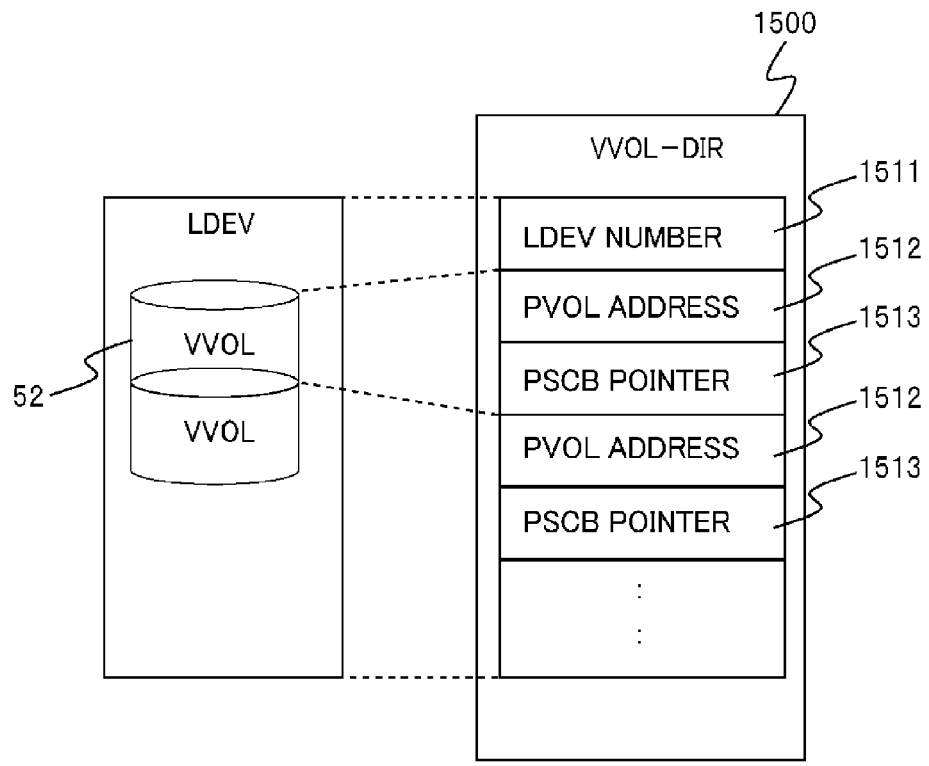
FIG. 15 is a diagram explaining a data structure of a VVOL-DIR 1500.

FIG. 15 shows the data structure of the VVOL-DIR 1500. As shown in the figure, the VVOL-DIR 1500 includes fields of a second LDEV number 1511, a PVOL address 1512, and a PSCB pointer 1513.

The second type LDEV number 1511 is set with the number of the second type LDEV forming the VVOL 52. The PVOL address 1512 is set with an address showing the storage area of the PVOL 53 forming the VVOL 52. The PSCB pointer 1513 is set with an address showing a storing location of the PSCB of the PVOL 52 forming the VVOL 52. Note that in a case where the VVOL 52 is configured by using storage areas of multiple PVOLs 53, the VVOL-DIR 1500 is set with multiple pairs of the PVOL address 1512 and the PSCB pointer 1513

FIG. 16 shows a model name information table 1600 stored by the storage apparatus 10. In the model name information table 1600, information on the model names of the PDEVs is managed. As shown in the figure, the model name information table 1600 is made up of one or more records each including fields of a model name 1611, a type 1612, a network interface (I/F 1613), a storage capacity 1614, an rotational speed 1615, and a transfer rate 1616.

The model name 1611 is set with the model name of the PDEV (product model name). The type 1612 is set with information indicating the type of the PDEV (HDD, SSD). The I/F 1613 is set with a network interface type (e.g., FC, SATA, SAS) which is provided to the PDEV with the model name. The storage capacity 1614 is set with the storage capacity of the PDEV having the model name. The rotational speed 1615 is set with the rpm of the media constructing the PDEV having the model name. The transfer rate 1616 is set with the maximum transfer rate of the PDEV having the model name.

Figure 17:
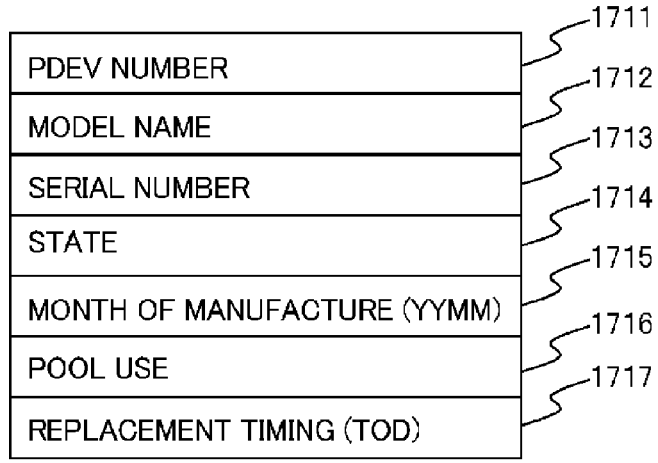
FIG. 17 is a diagram showing a record structure of a PDEV information table 1700.

FIG. 17 shows the record structure of the PDEV information table 1700 stored by the storage apparatus 10. In the PDEV information table 1700, information on the PDEV is managed. The PDEV information table 1700 is provided for each PDEV (as many as the PDEV). As shown in the figure, the PDEV information table 1700 includes fields of a PDEV number 1711, a model name 1712, a serial number 1713, a state 1714, a month of manufacture 1715, a pool use 1716, and a replacement timing 1717.

The PDEV number 1711 is an identifier assigned to each PDEV. The model name 1712 is set with the model name of the PDEV. The serial number 1713 is set with the serial number of the PDEV. The state 1714 is set with a state of the PDEV (e.g., "normal," "lock out," or "not mounted"). The month of manufacture 1715 is set with the month and year of manufacture of the PDEV. The pool use 1716 is set with information indicating whether or not the PDEV is currently an element of the pool 931. The replacement timing 1717 is set with information indicating replacement timing of the PDEV (e.g., service life or product life).

Figure 18:
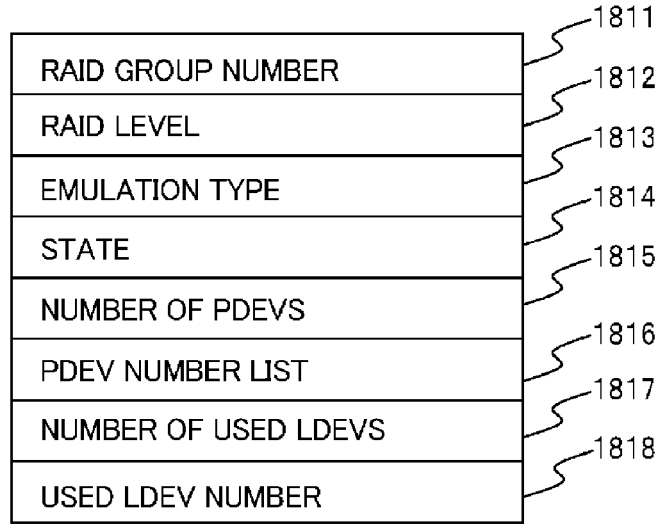
FIG. 18 is a diagram showing a record structure of a RAID group information table 1800.

FIG. 18 shows the record structure of the RAID group information table 1800 stored by the storage apparatus 10. In the RAID group information table 1800, information on the RAID group including the PDEVs is managed. The RAID group information table 1800 is provided for each RAID group. The RAID group information table 1800 is made up of at least one record including fields of a RAID group number 1811, a RAID level 1812, an emulation type 1813, a state 1814, the number of PDEVs 1815, a PDEV number list 1816, the number of used LDEVs 1817, and a used LDEV number 1818.

The RAID group number 1811 is set with an identifier of the RAID group. The RAID level 1812 is set with information indicating the level of the RAID group (RAID 0-6). The emulation type 1813 is set with information indicating in what manner (e.g., in a format for a mainframe host, for an open server, and the like) the RAID group is to be provided to the higher level one (e.g., an emulation type of such as the format "OPEN-V" for an open server). The state 1814 is set with a current state of the RAID group (e.g., "normal," "lock out," or "not mounted"). The number of PDEVs 1815 is set with the number of PDEVs which are included in the RAID group. The PDEV number list 1816 is set with a list of PDEV numbers of the PDEVs which are included in the RAID group. The number of used LDEVs 1817 is set with the number of the first type LDEVs that are used by the RAID group. The used LDEV number 1818 is set with an identifier of the first type LDEV that is used by the RAID group.

Figure 19:
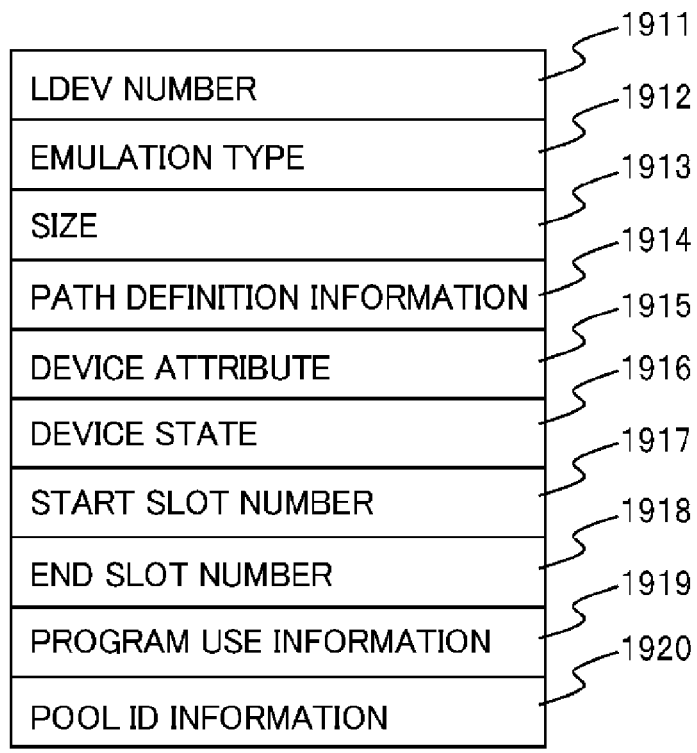
FIG. 19 is a diagram showing a record structure of an LDEV management information table 1900.

FIG. 19 shows the record structure of the LDEV management information table 1900 stored by the storage apparatus 10. In the LDEV management information table 1900, information (hereinafter referred to as LDEV management information) on the LDEV (the first type LDEV, the second type LDEV) is managed. The LDEV management information table 1900 is provided for each LDEV. The LDEV management information table 1900 is made up of at least one record including fields of an LDEV number 1911, an emulation type 1912, a size 1913, path definition information 1914, a device attribute 1915, a device state 1916, a start slot number 1917, an end slot number 1918, a program use information 1919, and a pool ID information 1920.

The LDEV number 1911 is set with an identifier assigned to each LDEV. The emulation type 1912 is set with the emulation type of the LDEV (e.g., "OPEN-V"). The size 1913 is set with the size of the storage area of the LDEV. The path definition information 1914 is set with information indicating the location of the LDEV. The device attribute 1915 is set with information indicating the type of the LDEV (the first type LDEV or the second type LDEV)

The device state 1916 is set with a state of the LDEV ("normal," "lock out," or "not mounted"). The start slot number 1917 is set with the start slot number of the slots (the first slot or the second slot) managed by the LDEV. The end slot number 1918 is set with the end slot number of the slots (the first slot or the second slot) managed by the LDEV. The program use information 1919 is set with information on the program used by each LDEV. The pool ID information 1920 is set with information on the pool ID to identify the pool 53 forming the LDEV.

FIG. 20 shows the record structure of the VDEV management information table 2000 stored by the storage apparatus 10. In the VDEV management information table 2000, information on the VDEV (hereinafter referred to as VDEV management information) is managed. The VDEV management information table 2000 is provided for each VDEV. The VDEV management information table 2000 is made up of at least one record including fields of a VDEV number 2011, an emulation type 2012, a total size 2013, a free space size 2014, a device attribute 2015, a device state 2016, a tier level 2017, the number of set LDEVs 2018, an LDEV number 2019, a start LDEV slot number 2020, and an end LDEV slot number 2021.

The VDEV number 2011 is set with an identifier assigned to each VDEV. The emulation type 2012 is set with the emulation type of the VDEV (e.g., OPEN-V). The total size 2013 is set with the size of the storage area of the DVEV. The free space size 2014 is set with the free space size of the storage area of the DVEV. The device attribute 2015 is set with information indicating the VDEV is either the first type VDEV or the second type VDEV. The device state 2016 is set with a current state of the VDEV ("normal," "lock out," or "not mounted"). The Tier level 2017 is set with information indicating the tier (Tier level) of the first type LDEV associated with the VDEV. The details of the tier are described later.

The number of set LDEVs 2018 is set with the number of LDEVs (the first type LDEV, the second type LDEV) associated with the VDEV. The LDEV number 2019 is set with the LDEV number (e.g., "LDEV number 1") which is an identifier of the LDEV associated with the VDEV (the first type LDEV, the second type LDEV). The start LDEV slot number 2020 is set with a start LDEV slot number of the slot (the first slot or the second slot) which is managed by the first LDEV or the second LDEV identified by the LDEV number 2019. The end LDEV slot number 2021 is set with the end LDEV slot number of the slot (the first slot or the second slot) which is managed by the first LDEV or the second LDEV identified by the LDEV number 2019.

A plurality of combinations of the LDEV number 2019, the start LDEV slot number 2020 and the end LDEV slot number 2021 are set in the VDEV management information table 2000.

Figure 21:
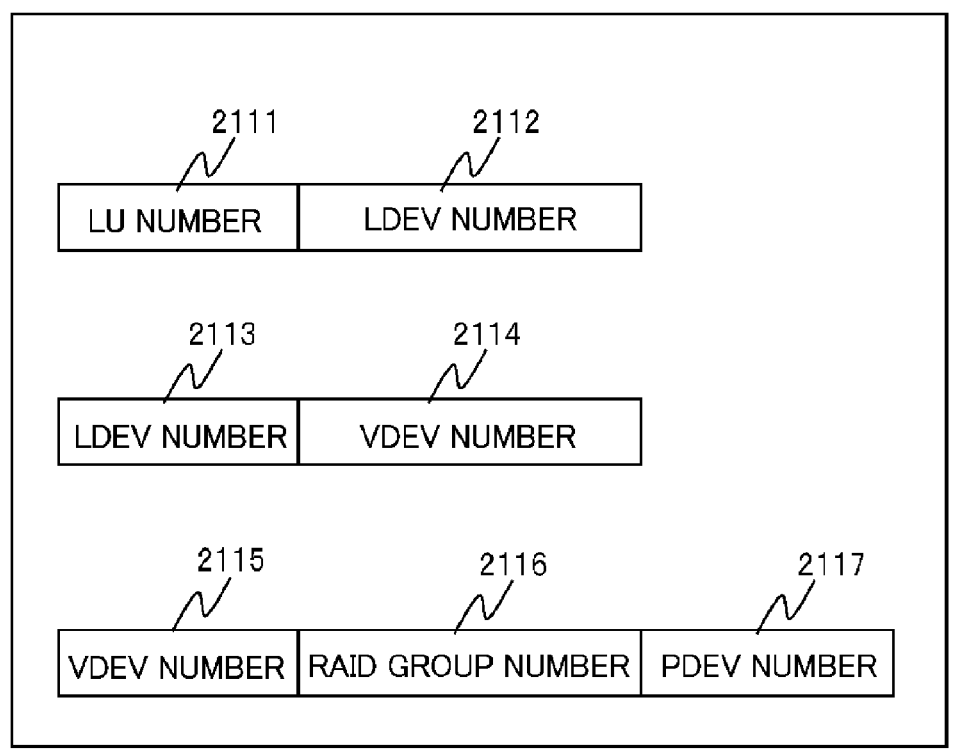
FIG. 21 is a diagram showing a record structure of a mapping table 2100.

FIG. 21 shows the mapping table 2100 stored by the storage apparatus 10. In the mapping table 2100, correspondences (records) between the management units of storage areas (LU, LDEV, VDEV, PDEV, and RAID group) are managed. Specifically, a correspondence between an LU number 2111 (LUN) which is an identifier of LU and the LDEV number 2112, a correspondence between the LDEV number 2113 and the VDEV number 2114, and a correspondence among the VDEV number 2115, the RAID group number 2116, and the PDEV number 2117 are managed. The mapping table 2100 shown in FIG. 21 is only an example, and the storage apparatus 10 manages correspondences between other various management units of storage areas as needed in FIG. 21.

Figure 22:
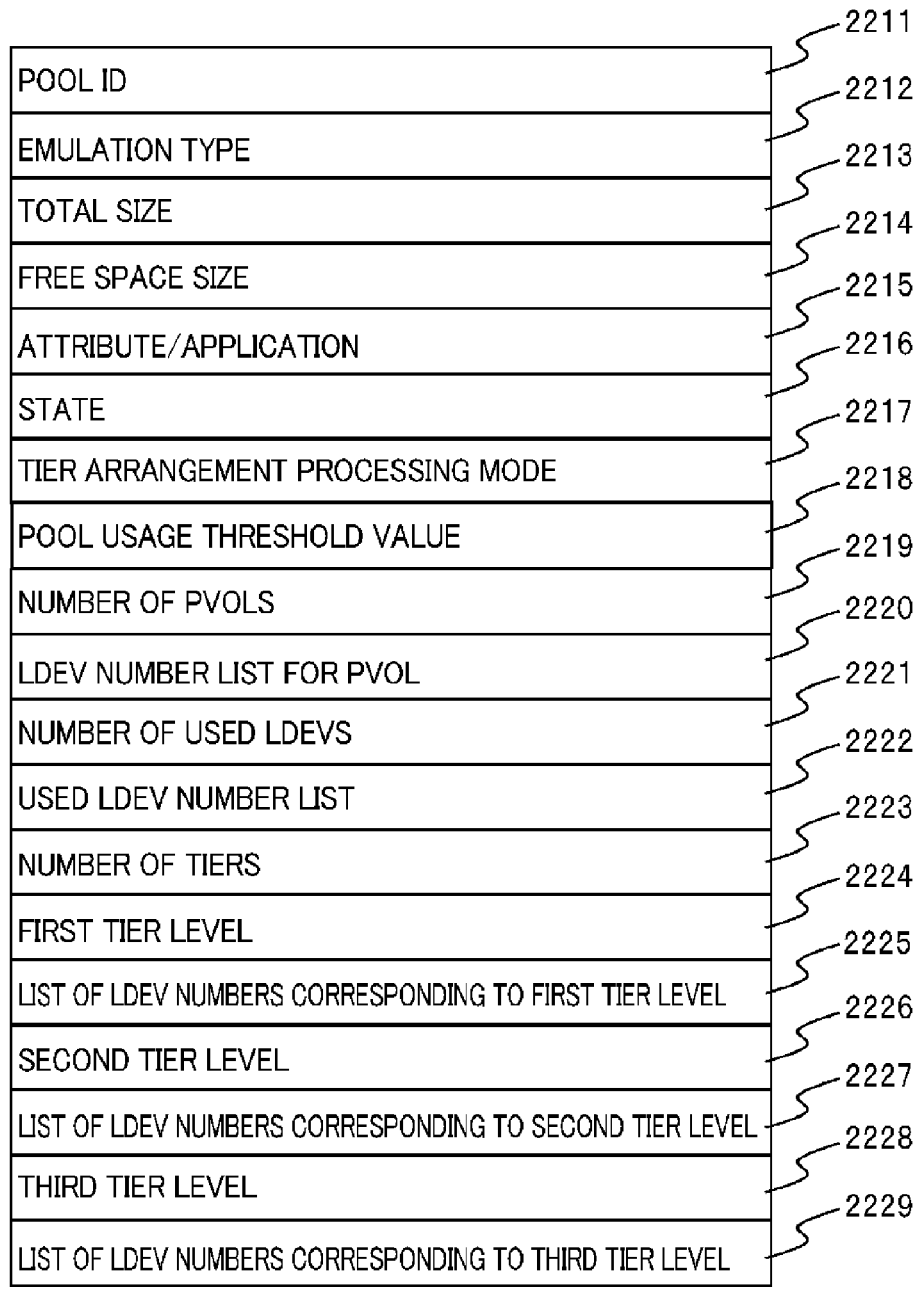
FIG. 22 is a diagram showing a record structure of a pool information table 2200.

FIG. 22 shows the record structure of the pool information table 2200 stored by the storage apparatus 10. In the pool information table 2200, information on the pool 931 is managed. The pool information table 2200 is provided for each pool 931. The pool information table 2200 is made up of at least one record including fields of a pool ID 2211, an emulation type 2212, a total size 2213, a free space size 2214, an attribute/application 2215, a state 2216, a tier arrangement processing mode 2217, a pool usage threshold value 2218, a number of PVOLs 2219, an LDEV number list for a PVOL 2220, the number of used LDEVs 2221, a used LDEV number list 2222, the number of tiers 2223, a first tier level 2224, a list of LDEV numbers corresponding to first tier level 2225, a second tier level 2226, a list of LDEV numbers corresponding to second tier level 2227, a third tier level 2228, and a list of LDEV numbers corresponding to third tier level 2229.

The pool ID 2211 is set with an identifier assigned to each pool 931. The emulation type 2212 is set with the emulation type of the pool 931 (e.g., "OPEV-V"). The total size 2213 is set with the size of the storage area of the pool 931. The free space size 2214 is set with the free space size of the storage area of the pool 931. The attribute/application 2215 is set with information on the attribute or application of the pool 931 (e.g., snapshot, SYS).

The state 2216 is set with a state of the pool 931 (e.g., "under tier level arrangement execution," "under replacement processing," "normal, or "lock out"). The tier arrangement processing mode 2217 is set with information indicating a processing mode ("ON," "AUTO" (first processing mode), or "OFF" (the second processing mode)) which is set for the pool 931 and is used in tier arrangement processing S3300 to be described later. The pool usage threshold value 2218 is set with a threshold value of a usage for a pool capacity. The number of PVOLs 2219 is set with the number of the PVOLs 53 that form the pool 931. The LDEV number list for a PVOL 2220 is set with a list of LDEV numbers of the LDEVs (the first type LDEV) corresponding to the PVOLs 53 which form the pool 931.

The number of used LDEVs 2221 is set with the number of LDEVs (the second type LDEV) which use the pool 931. The used LDEV number list 2222 is set with the LDEV number of the LDEV (the second type LDEV) which uses the pool 931.

The number of tiers 2223 is set with the number of tiers (tier levels) provided by the pool 931. For example, if the pool 931 provides three tiers of "Tier 0," "Tier 1," and "Tier 2," the number of tiers 2223 is set with "3."

The first tier level 2224 is set with information indicating a tier (e.g., "Tier 0"). The list of LDEV numbers corresponding to first tier level 2225 is set with a list of numbers of the LDEVs (the first type LDEV) of the tier level identified by the first tier level 2224.

The second tier level 2226 is set with information indicating a tier (e.g., "Tier 1"). The list of LDEV numbers corresponding to second tier level 2227 is set with the list of numbers of the LDEVs (the first type LDEV) of the tier level identified by the second tier level 2226.

The third tier level 2228 is set with information indicating a tier (e.g., "Tier 2"). The list of LDEV numbers corresponding to third tier level 2229 is set with the list of numbers of the LDEVs (the first type LDEV) of the tier level identified by the third tier level 2228.

FIG. 23 shows the pool management table 2300 stored by the storage apparatus 10. In the pool management table 2300, information on the pool 931 is managed. As shown in the figure, the pool management table 2300 is made up of one or more records each including fields of a pool ID 2311, the number of total pages 2312, the number of used pages 2313, and an LDEV number list 2314.

The pool ID 2311 is set with an identifier (pool ID) assigned to each pool 931. The number of total pages 2312 is set with the total number of logical pages present in the pool 931, which are described later. The number of used pages 2313 is set with the number of currently used logical pages in the pool 931. The LDEV number list 2314 is set with a list of LDEV numbers of the first type LDEVs which form the pool 931.

FIG. 24 shows the PVOL management table 2400 stored by the storage apparatus 10. In the PVOL management table 2400, information on the PVOL 53 forming the pool 931 is managed. The PVOL management table 2400 is provided for each pool 931. As shown in the figure, the PVOL management table 2400 is made up of one or more records each including fields of an LDEV number 2411, the number of total pages 2412, the number of used pages 2413, and a tier number 2414.

The LDEV number 2411 is set with the LDEV number of the LDEV (numbers of the first type LDEV) which forms the PVOL 53. The number of total pages 2412 is set with the total number of physical pages in the LDEV, which are described later. The number of used pages 2413 is set with the number of currently used physical pages in the LDEV. The tier number 2414 is set with information indicating the tier of the LDEV.

FIG. 25 shows the tier management table 2500 stored by the storage apparatus 10. In the tier management table 2500, information on the tiers provided by the pool 931 is managed. The tier management table 2500 is provided for each pool 931. As shown in the figure, the tier management table 2500 is made up of one or more records each including fields of a tier number 2511, the number of total pages 2512, the number of used pages 2513, and an LDEV number list 2514.

The tier number 2511 is set with information to identify a tier. The number of total pages 2512 is set with the total number of physical pages in the LDEV that provides the tier, which is described later. The number of used pages 2513 is set with the number of currently used physical pages in the LDEV that provides the tier. The LDEV number list 2514 is set with a list of the LDEV numbers of the LDEVs that provides the tier.

FIG. 26 shows the PSCB queue management table 2600 stored by the storage apparatus 10. In the PSCB queue management table 2600, a use state of the first slot of the first type LDEV is managed.

As shown in the figure, the PSCB queue management table 2600 is made up of one or more records each including fields of a queue number 2611, a free queue pointer 2612, an allocation queue pointer 2613, an LDEV number 2614, a pool ID 2615, and a tier number 2616.

The queue number 2611 is set with an identifier (queue number) to identify a record. The free queue pointer 2612 is set with information to identify the storage location (address) of the PSCB of free (can be allocated to the VVOL 52) first slot. The allocation queue pointer 2613 is set with information to identify the storage location (address) of the PSCB of the first slot which has been allocated to the VVOL 52.

The LDEV number 2614 is set with the LDEV number of the first type LDEV that provides the first slot. The pool ID 2615 is set with the pool ID of the pool 931 to which the first type LDEV belongs. The tier number 2616 is set with the tier (tier level) of the first type LDEV.

FIG. 27 shows the data replication progress management table 2700 stored by the storage apparatus 10. The data replication progress management table 2700 is a table used by the storage apparatus 10 to keep track of a data replication progress in the data replication preprocessing S3900 and data replication processing S4000, which are described later.

As shown in the figure, the data replication progress management table 2700 is made up of one or more records each including fields of an LDEV number 2711, the number of replicated slots 2712, and the number of slots to be replicated 2713.

The LDEV number 2711 is set with the LDEV number of the first type LDEV forming the PVOL 53. The number of replicated slots 2712 is set with the number of the slots in the LDEV, which have been replicated. The number of slots to be replicated 2713 is set with the number of slots in the first type LDEV, which are destined to be replicated.

FIG. 28 shows the page performance information table 2800 stored by the storage apparatus 10. In the page performance information table 2800, an access frequency to physical pages (an access frequency per unit of time, for example, the sum of read times and write times of physical pages per unit of time) is managed.

As shown in the figure, a physical page ID 2811 is set with a physical page ID which is an identifier of a physical page and is described later. An access frequency 2812 is set with a read frequency of the physical page per unit of time (read times 28121), and a write frequency of the physical page per unit of time (write times 28122).

Figure 29:
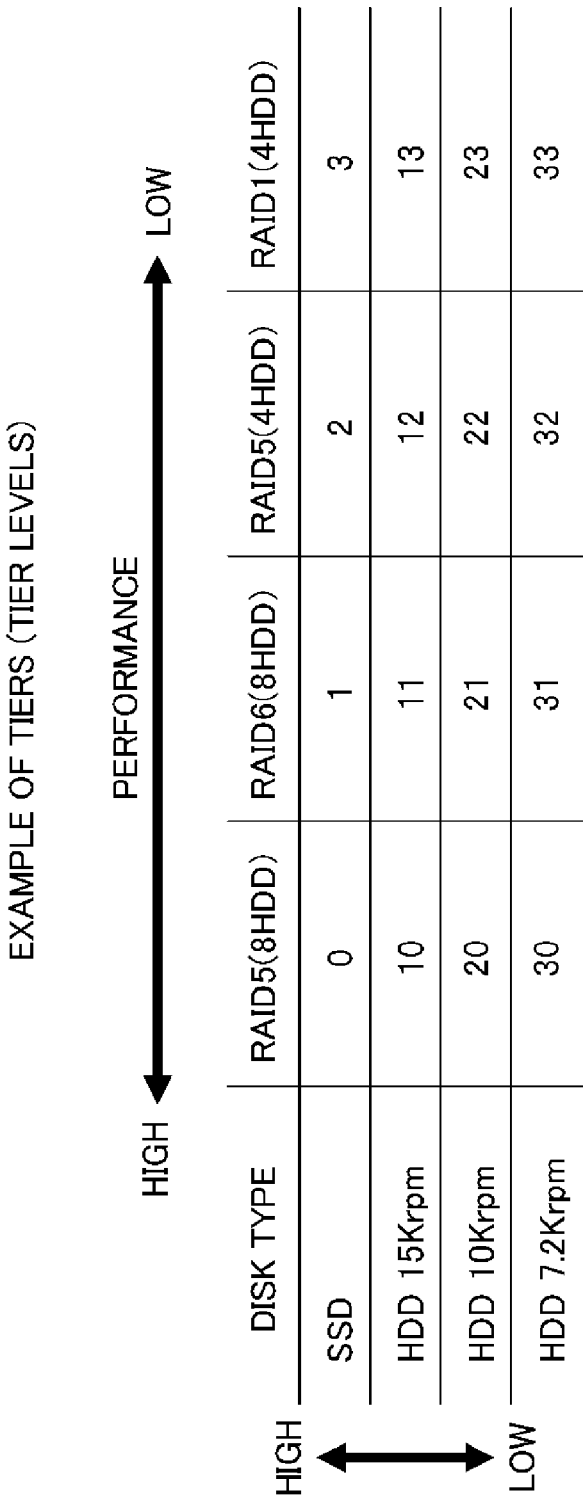
FIG. 29 is a diagram explaining tier levels.

FIG. 29 shows an example of relationship between tier levels and performance/type of the physical drive 171. A number in the table shown in the figure indicates a tier level.

<Replacement Processing>

Figure 30:
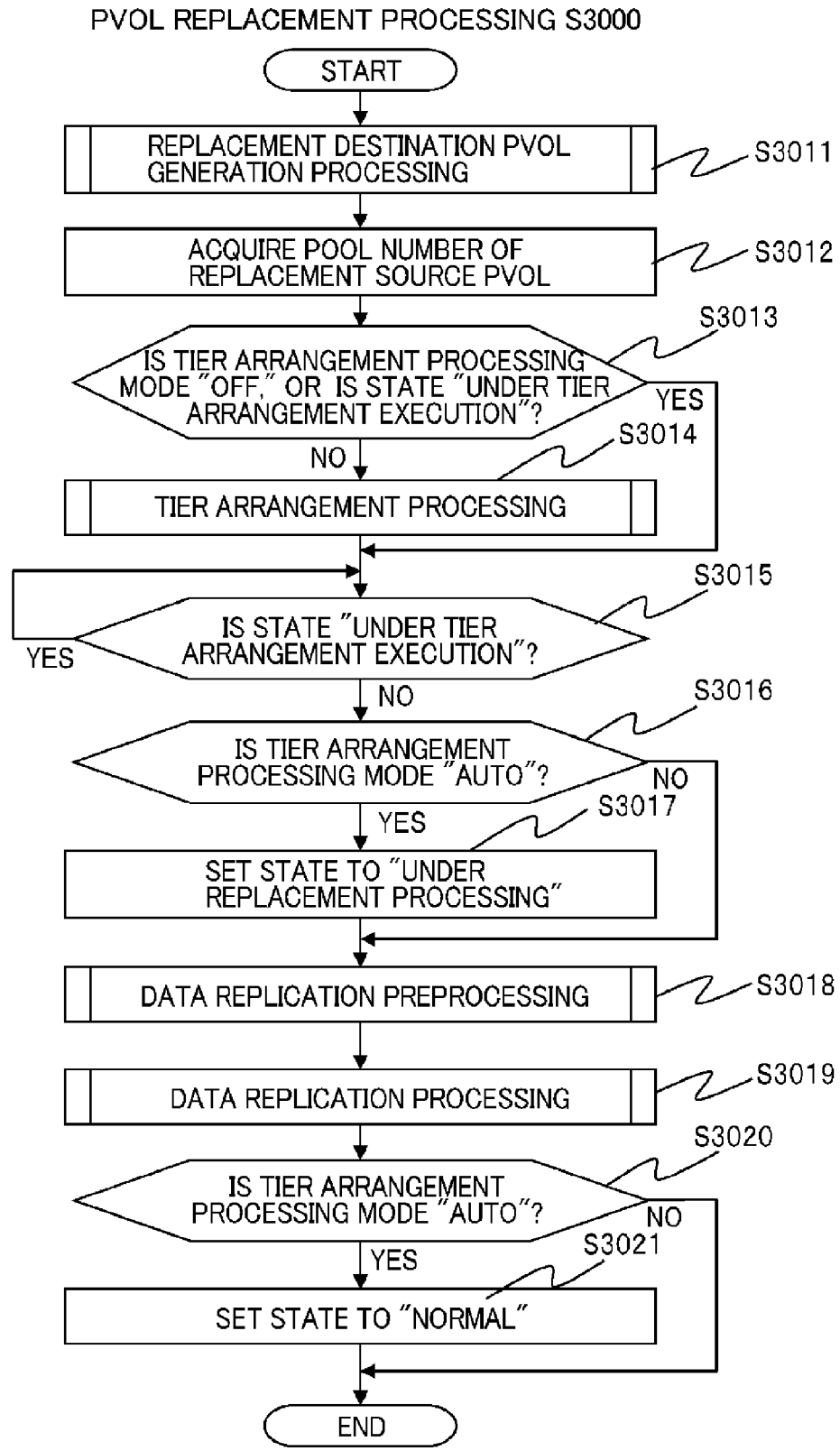
FIG. 30 is a flowchart explaining PVOL replacement processing S3000.

FIG. 30 is a flowchart explaining processing related to PVOL replacement (hereinafter referred to as PVOL replacement processing S3000 (replacement processing)) of the PVOL 53 to be performed by a PVOL replacement processing part 713 (replacement processing part) while the storage apparatus 10 is in operation. The PVOL replacement processing S3000 is started when, for example, a user performs an activation operation of the PVOL replacement processing S3000 on the management device 7. Hereinbelow, the PVOL replacement processing S3000 is described with reference to FIG. 30.

As shown in the figure, the PVOL replacement processing part 713 performs generation processing (hereinafter referred to as PVOL generation processing S3100) of PVOL 53 which is the destination of the replacement (S3011). The details of the processing are described later.

The PVOL replacement processing part 713 then acquires the pool ID of the pool 931 to which a PVOL 53 as a replacement object (hereinafter referred to as a replacement source) belongs (S3012). The above-mentioned acquisition is made by, for example, obtaining the number of the first type LDEV forming the replacement source PVOL 53 from the user via the management device 7, and referencing to the pool information table 2200 or the pool management table 2300 with the acquired number of the first type LDEV.

The PVOL replacement processing part 713 then checks whether or not the tier arrangement processing mode 2217 of the pool information table 2200 is set to "OFF," and also whether or not the state 2216 of the pool information table 2200 is set to "under tier level arrangement execution." If the tier arrangement processing mode 2217 of the pool information table 2200 is set to "OFF" or the state 2216 of the pool information table 2200 is set to "under tier level arrangement execution" (S3013: YES), the process proceeds to S3015. If (S3013: NO), the process proceeds to S3014.

In S3014, the PVOL replacement processing part 713 activates the tier arrangement processing in conjunction with the tier arrangement processing part 714. The tier arrangement processing is described later.

In S3015, the PVOL replacement processing part 713 stands by until the tier arrangement processing is completed. In other words, the PVOL replacement processing part 713 checks whether or not the state 2216 of the pool information table 2200 is set to "under tier level arrangement execution." If the state 2216 of the pool information table 2200 is not set to "under tier level arrangement execution" (S3015: NO), the process proceeds to S3016.

In S3016, the PVOL replacement processing part 713 checks whether or not "AUTO" is set to the tier arrangement processing mode 2217. If "AUTO" is set thereto (S3016: YES), the process proceeds to S3017. If "AUTO" is not set thereto (S3016: NO), the process proceeds to S3018.

In S3016, the PVOL replacement processing part 713 sets "under replacement processing" to the state 2216 of the pool information table 2200.

In S3018, the PVOL replacement processing part 713 executes data replication pre-processing. The details of the data replication preprocessing are described later.

In S3019, the PVOL replacement processing part 713 executes data replication processing. The details of the data replication processing are described later.

In S3020, the PVOL replacement processing part 713 checks whether or not "AUTO" is set to the tier arrangement processing mode 2217. If "AUTO" is set thereto (S3020: YES), the process proceeds to S3021. If "AUTO" is not set thereto (S3020: NO), the process is terminated.

In S3021, the PVOL replacement processing part 713 sets "normal" to the state 2216 of the pool information table 2200.

<Replacement Destination PVOL Generation Processing>

Figure 31:
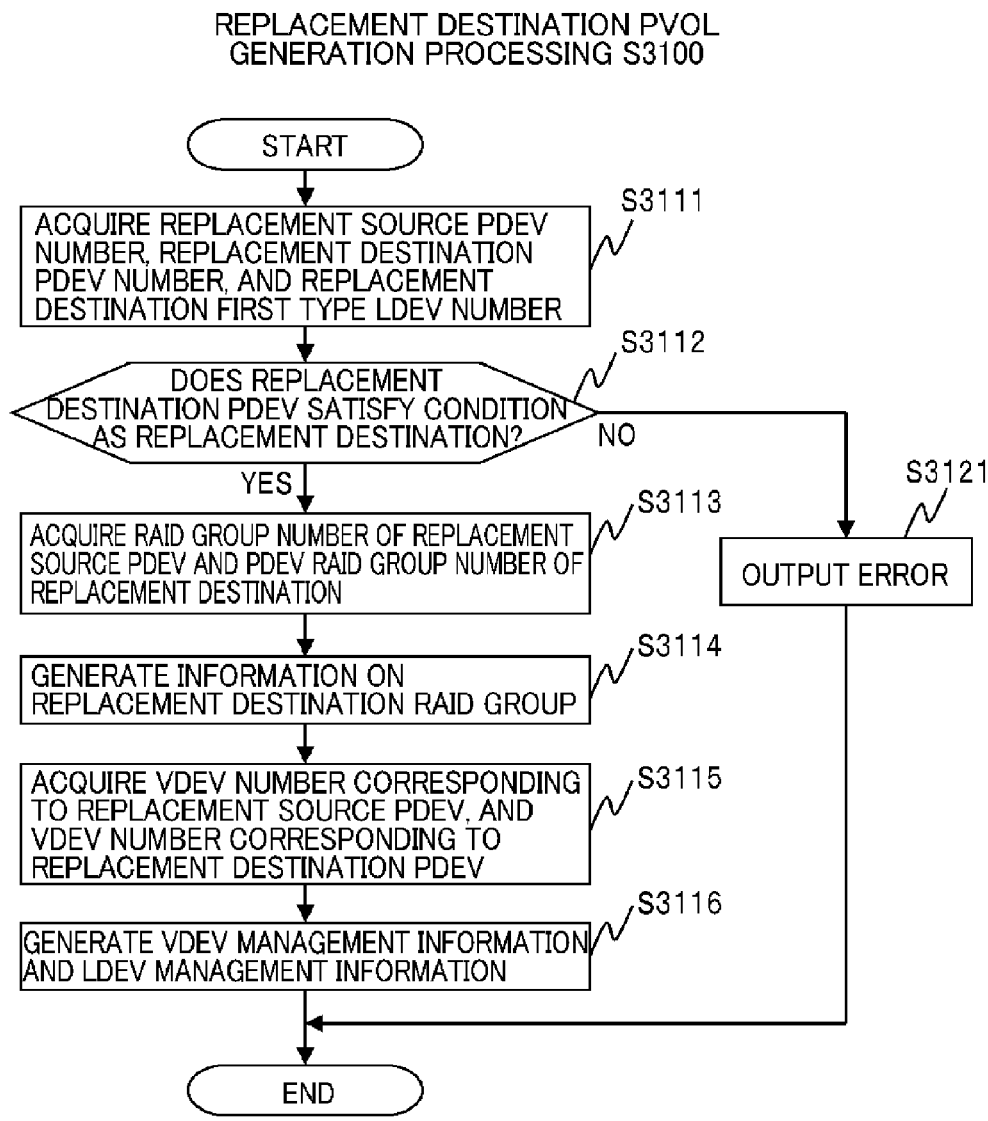
FIG. 31 is a flowchart explaining replacement destination PVOL generation processing S3100.

FIG. 31 is a flowchart explaining replacement destination PVOL generation processing S3100 in S3011 of FIG. 30. Hereinbelow, the replacement destination PVOL generation processing S3100 is described with reference to FIG. 31.

First, the PVOL replacement processing part 713 acquires and stores one or more pairs of: the number of a PDEV forming a replacement source PVOL 53 designated by the user via the management device 7; and the number of a PDEV to be a component of a replacement destination PVOL 53. The PVOL replacement processing part 713 also acquires and stores the number of one or more first type LDEVs (first type LDEVs forming the replacement destination PDEV) which are created in the replacement processing (S3111). The PVOL replacement processing part 713 stores the information, for example, in the memory 123 of the processor board 12 or the shared memory 15.

The PVOL replacement processing part 713 then sequentially checks each pair of the replacement source PDEV number and replacement destination PDEV number acquired in S3111, and determines for each pair whether or not the replacement destination PDEV satisfies the requirement as a replacement destination (S3112). If the replacement destination PDEV satisfies the requirement (S3112: YES), the process proceeds to S3113. If the replacement destination PDEV does not satisfy the requirement (S3112: NO), the PVOL replacement processing part 713 outputs an error occurrence to the management device 7 to terminate the process (S3121). The PVOL replacement processing part 713 checks the above-mentioned requirement by referencing to the model name information table 1600 to determine, for example, whether the type of the replacement destination PDEV coincides with that of the replacement source PDEV (the type 1612, the I/F 1613 in FIG. 16), and whether the performances (the storage capacity 1614, the rotational speed 1615, and the transfer rate 1616) of the replacement destination PDEV are equal to or greater than those of the replacement source PDEV.

In S3113, the PVOL replacement processing part 713 refers to the mapping table 2100 to acquire RAID group numbers corresponding to replacement source PDEV numbers and RAID group numbers corresponding to replacement destination PDEV numbers. Then the PVOL replacement processing part 713 generates RAID group information of the replacement destination, whose RAID level and emulation type are made coincide with those of the RAID group of the replacement source (S3114).

In S3115, the PVOL replacement processing part 713 references to the mapping table 2100 to acquire VDEV numbers corresponding to replacement source PDEV numbers and VDEV numbers corresponding to replacement destination PDEV numbers. Then, the PVOL replacement processing part 713 generates and stores VDEV management information and LDEV management information of the replacement destination, whose LDEV number and size are made coincide with those of the VDEV management information and LDEV management information of the replacement source (S3116).

<Tier Arrangement Processing>

The storage area management part 712 in the storage apparatus 10 manages the storage area of the VVOL 52 (storage area of the second type LDEV) by using a predetermined management unit (hereinafter referred to as a logical page). The storage area management part 712 allocates the storage area provided by a PVOL 53 (storage area of the first type LDEV) to a logical page by using a predetermined allocation unit (hereinafter referred to as a physical page).

Figure 32:
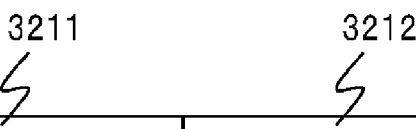
FIG. 32 is a diagram showing a page mapping table 3200.

FIG. 32 shows a table (hereinafter referred to as a page mapping table 3200) managed by the storage apparatus 10, in which a correspondence between an identifier (hereinafter referred to as a logical page ID) of a logical page and an identifier (hereinafter referred to as a physical page ID) of a physical page is managed.

As shown in the figure, the page mapping table 3200 is made up of one or more records each including fields of: a logical page ID 3211 to which a logical page ID is set; and a physical page ID 3212 to which the physical page ID of a physical page is set, the physical page being currently allocated to the logical page ID. As for a logical page to which a physical page is not allocated, the physical page ID 3212 corresponding to the logical page ID is set with information indicating that no physical page is allocated to the logical page ("NONE" in FIG. 32).

As described above, the first type LDEV forming the PVOL 53 is classified into tier levels. As shown in FIG. 29, the tier is information (attribute) set to individual first type LDEVs according to the characteristics of the physical drive 171 (e.g., the type, performance, reliability, cost and the like of the physical drive 171) which forms the first type LDEV. Setting of a tier to individual first type LDEVs can be made by a user such as an operator via the management device 7 or the maintenance device 18. Note that in the present embodiment, multiple tiers are assumed to be orderly set in such a manner that higher the performance and cost (provided cost per unit storage area) of the physical drive 171, higher the tier of the corresponding LDEV. Each physical drive 171 is assumed to be set with a tier identified by one of identifiers, "Tier 1," "Tier 2," "Tier 3," etc. in order from a higher tier (smaller the number, higher the tier).

The tier arrangement processing part 714 of the storage apparatus 10 acquires the access frequency (the number of accesses per unit of time) of a logical page, i.e., the access frequency (the access frequency 2812 managed in the page performance information table 2800) of a physical page allocated to the logical page, as needed, and determines an appropriate tier of a physical page to be allocated to the logical page according to the acquired access frequency of the logical page. If the tier currently assigned to the logical page is different from the determined tier, the correspondence between the logical page and the physical page in the page mapping table 3200 is changed (hereinafter, processing involved in the change is referred to as a data migration). At the time of data migration, the tier arrangement processing part 714 replicates the content of the physical page currently allocated to the logical page to a physical page to be newly allocated to the logical page.

Note that there are two cases of data migration: one case where the physical page allocated to the logical page is changed from a lower to a higher tier (hereinafter referred to as a logical page migration to higher tier); and the other case where the physical page allocated to the logical page is changed from a higher to a lower tier (hereinafter referred to as a logical page migration to lower tier).

Figure 33:
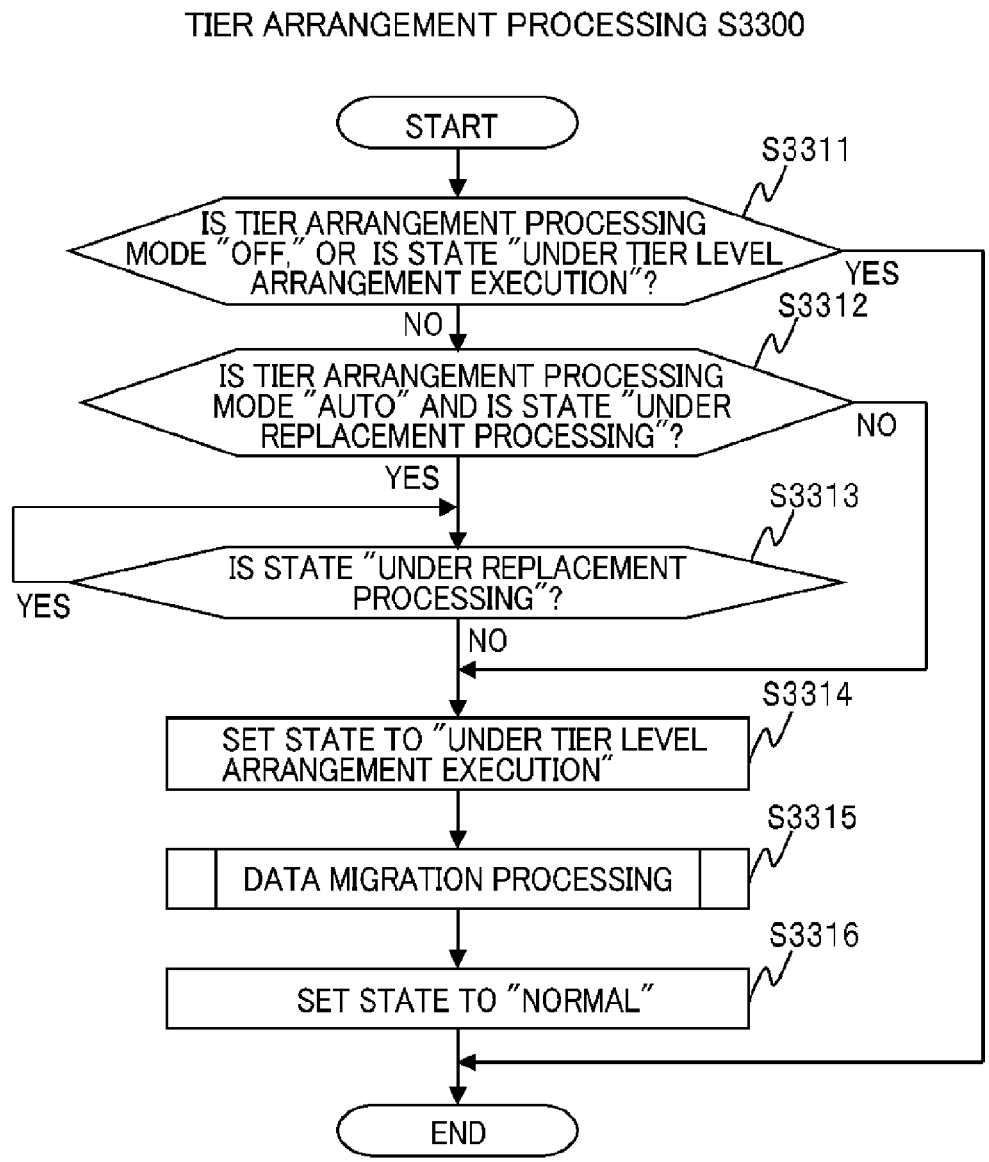
FIG. 33 is a flowchart explaining tier arrangement processing S3300.

FIG. 33 shows a flowchart explaining the processing in S3014 of FIG. 30 (hereinafter referred to as tier arrangement processing S3300). Hereinbelow, the tier arrangement processing S3300 is described with reference to FIG. 33. Note that the tier arrangement processing S3300 is performed for all of the pools 931 (all of the pools 931 corresponding to all pool IDs) in the storage apparatus 10.

First, the tier arrangement processing part 714 checks whether or not the tier arrangement processing mode 2217 of the pool information table 2200 is set to "OFF," and whether or not the state 2216 of the pool information table 2200 is set to "under tier level arrangement execution" (S3311). If the tier arrangement processing mode 2217 of the pool information table 2200 is set to "OFF" or the state 2216 of the pool information table 2200 is set to "under tier level arrangement execution" (S3311: YES), the process is terminated. In other cases (S3311: NO), the process proceeds to S3312.

The tier arrangement processing part 714 then checks whether or not the tier arrangement processing mode 2217 of the pool information table 2200 is set to "AUTO," and concurrently the state 2216 of the pool information table 2200 is set to "under replacement processing" (S3312). If the tier arrangement processing mode 2217 of the pool information table 2200 is set to "AUTO," and the state 2216 of the pool information table 2200 is set to "under replacement processing" (S3312: YES), the process proceeds to S3313. In other cases (S3312: NO), the process proceeds to S3314.

In S3313, the tier arrangement processing part 714 stands by until the replacement processing of the PVOL 53 is completed. In other words, the tier arrangement processing part 714 checks whether or not the state 2216 of the pool information table 2200 is set to "under replacement processing." If the state 2216 is not set to "under replacement processing" (S3313: NO), the process proceeds to S3314.

In S3314, the tier arrangement processing part 714 sets the state 2216 of the pool information table 2200 to "under tier level arrangement execution."

In S3315, the tier arrangement processing part 714 performs the processing of the above-mentioned data migration for the pool 931. The details of the processing are described later.

In S3316, the tier arrangement processing part 714 sets the state 2216 of the pool information table 2200 to "normal."

Figure 34:
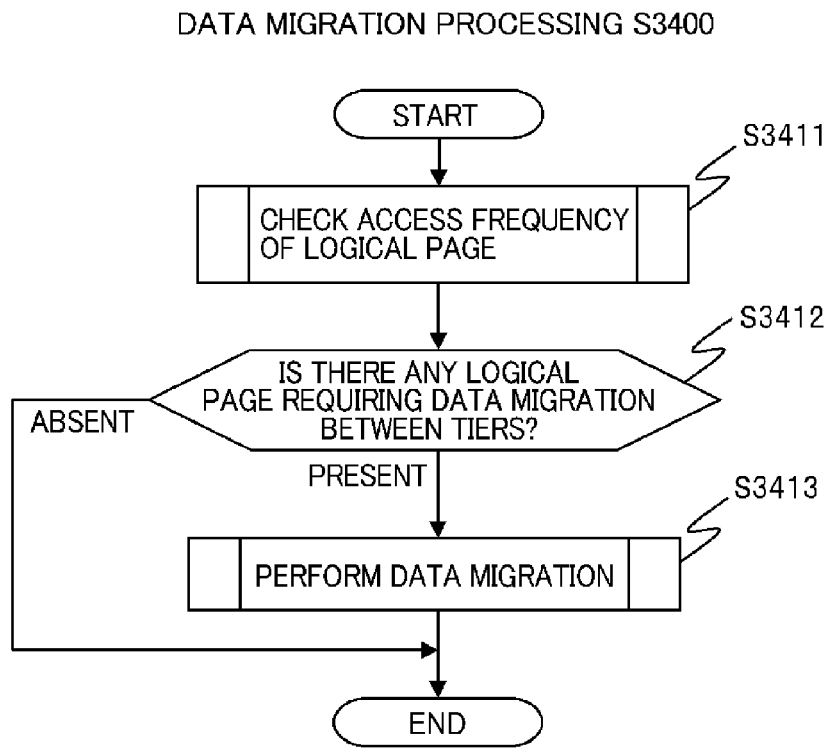
FIG. 34 is a flowchart explaining data migration processing S3400.

FIG. 34 shows a flowchart explaining the processing in S3315 of FIG. 33 (hereinafter referred to as data migration processing S3400). Hereinbelow, the data migration processing S3400 is described with reference to the figure.

First, the tier arrangement processing part 714 references to the page performance information table 2800 to check the access frequency of each logical page (S3411) to determine whether or not there exists any logical page for which data migration is needed between tiers (S3412). If there exists a logical page for which data migration is needed (S3412: present), the tier arrangement processing part 714 determines how the data migration is performed and then performs the data migration (S3413). If there exists no logical page for which data migration is needed (S3412: absent), the process is terminated.

Figure 35:
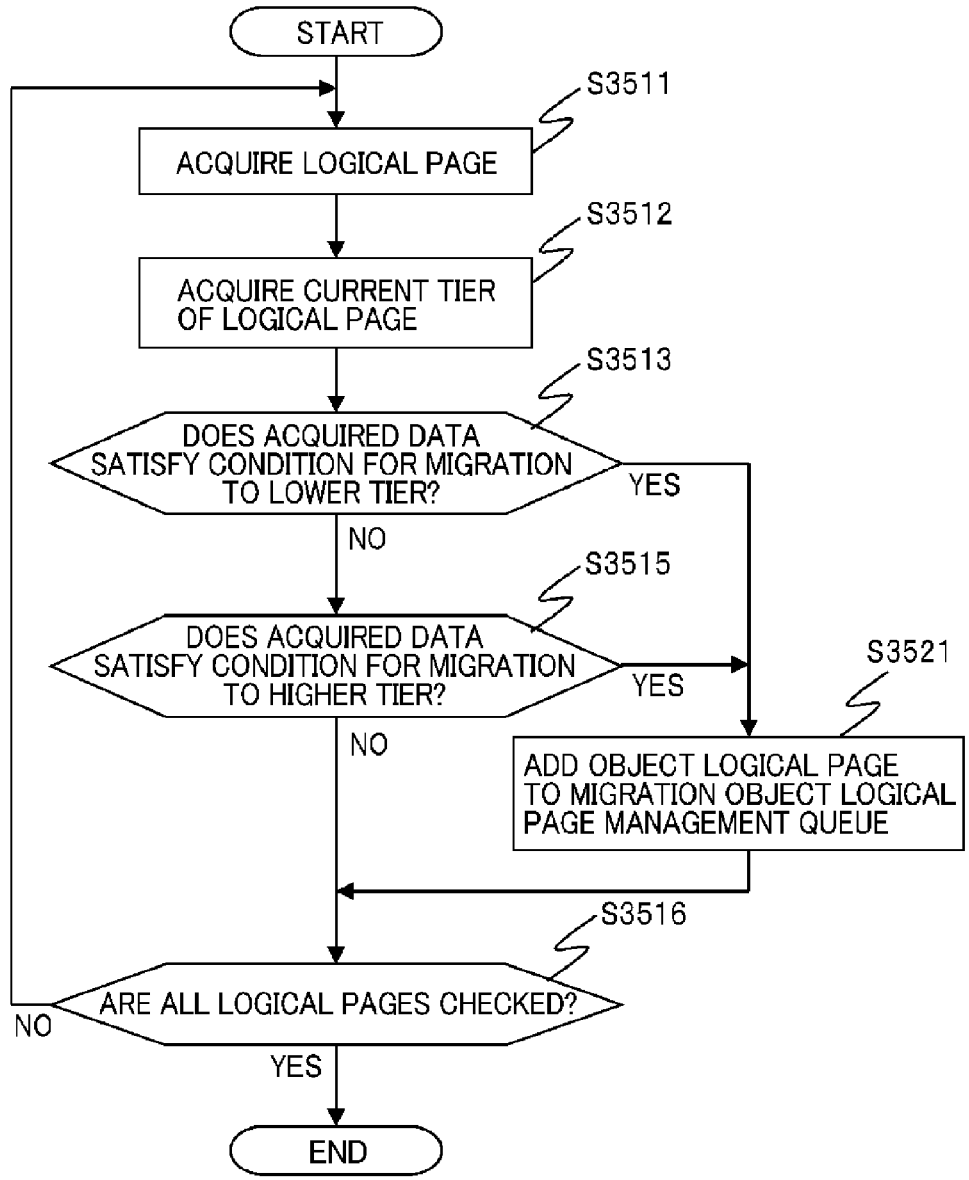
FIG. 35 is a flowchart explaining access frequency check processing S3500.

FIG. 35 shows a flowchart explaining the processing in S3411 of FIG. 34 (hereinafter referred to as access frequency check processing S3500). Hereinbelow, the access frequency check processing S3500 is described with reference to FIG. 35.

First, the tier arrangement processing part 714 acquires one of the logical pages that form the VVOL 52 (S3511), and references to the page mapping table 3200 to acquire the physical page currently allocated to the acquired logical page (hereinafter referred to as an object logical page). The tier arrangement processing part 714 then acquires the current tier (tier level) of the first type LDEV, to which the acquired physical page belongs, from the pool information table 2200 (S3512).

The tier arrangement processing part 714 then references to the page performance information table 2800, and checks the inter-tier migration requirement condition table 3600 with the current tier of the logical page acquired in S3512 to see whether or not the object logical page satisfies a condition for migration to lower tier 3613 (S3513). Note that the content of the inter-tier migration requirement condition table 3600 is set, for example, by a user such as an operator accessing the inter-tier migration requirement condition table 3600 via the management device 7 or the maintenance device 18 as needed. If the object logical page satisfies the condition for migration to lower tier 3613 (S3513: YES), the process proceeds to S3521. If the object logical page does not satisfy the condition for migration to lower tier 3613 (S3513: NO), the process proceeds to S3515.

In S3521, the tier arrangement processing part 714 adds the record of the object logical page to the migration object logical page management queue 3700 shown in FIG. 37, and then the process proceeds to S3516. Note that as shown in the figure, the migration object logical page management queue 3700 includes fields of a logical page ID 3711, a tier of migration source 3712, and a tier of migration destination 3713. Note that the tier arrangement processing part 714 acquires the tier of migration source and the tier of migration destination from the inter-tier migration requirement condition table 3600 as the above-mentioned record is added and sets both tiers to the added record.

In S3515, the tier arrangement processing part 714 checks the inter-tier migration requirement condition table 3600 shown in FIG. 36 with the access frequency of the physical page allocated to the object logical page acquired from the page performance information table 2800 to determine whether or not the object logical page satisfies a condition for migration to higher tier 3612. If the object logical page satisfies the condition for migration to higher tier 3612 (S3515: YES), the process proceeds to S3521, and the tier arrangement processing part 714 adds the record of the object logical page to the migration object logical page management queue 3700. If the object logical page does not satisfy the condition for migration to higher tier 3612 (S3515: NO), the process proceeds to S3516.

In S3516, the tier arrangement processing part 714 determines whether or not all the logical pages forming the VVOL 52 have been acquired (determined). If there exists any logical page which has not been acquired (determined) (S3516: NO), the process proceeds back to S3511 to acquire another logical page. If all the logical pages have been acquired (determined) (S3516: YES), the process is terminated.

Figure 38:
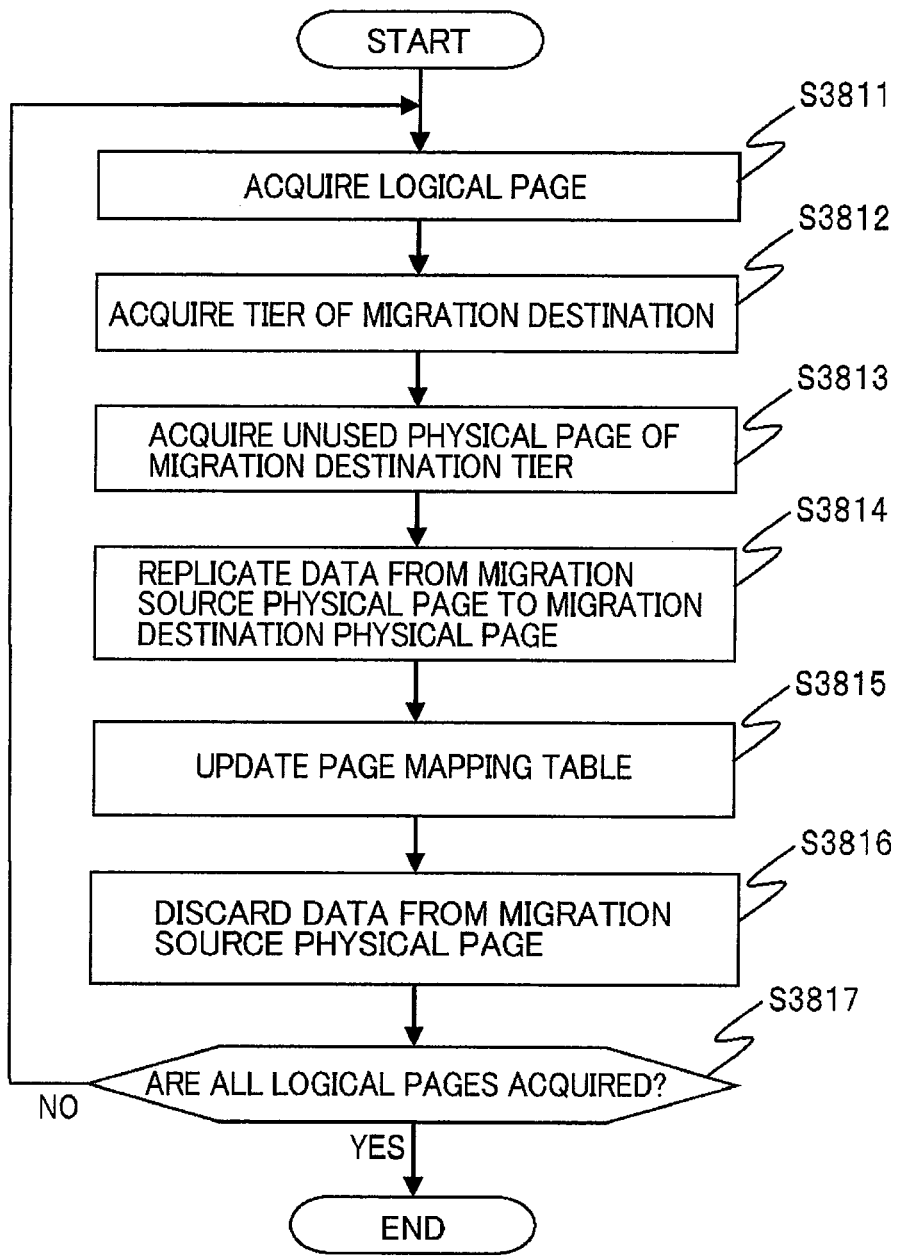
FIG. 38 is a flowchart explaining migration execution processing S3800.

FIG. 38 shows a flowchart explaining the processing in S3413 of FIG. 34 (hereinafter referred to as migration execution processing S3800). Hereinbelow, the migration execution processing S3800 is described with reference to the drawing.

First, the tier arrangement processing part 714 acquires one of logical pages that are registered in the migration object logical page management queue 3700 (S3811). The tier arrangement processing part 714 then references to the migration object logical page management queue 3700 to acquire the tier of the migration destination of the object logical page, then acquires an unused physical page at the tier (S3812, S3813).

The tier arrangement processing part 714 then replicates the data stored in the physical page of the migration source to the acquired unused physical page (S3814).

The tier arrangement processing part 714 then changes the content of the physical page ID 3212 corresponding to the logical page ID 3211 of the object logical page in the page mapping table 3200, to the physical page ID of the physical page of the migration destination (S3815). The tier arrangement processing part 714 then discards the physical page of the migration source determined unnecessary, namely changes the state of the physical page into an unused state by overwriting 0 data thereon (S3816).

The tier arrangement processing part 714 then determines whether or not all the logical pages have been acquired (in S3811) (S3817). If all the logical pages have not been acquired (S3817: NO), the process proceeds back to S3811 to acquire the next logical page. If all the logical pages have been acquired (S3817: YES), the process is terminated.

<Data Replication Preprocessing>

Figure 39:
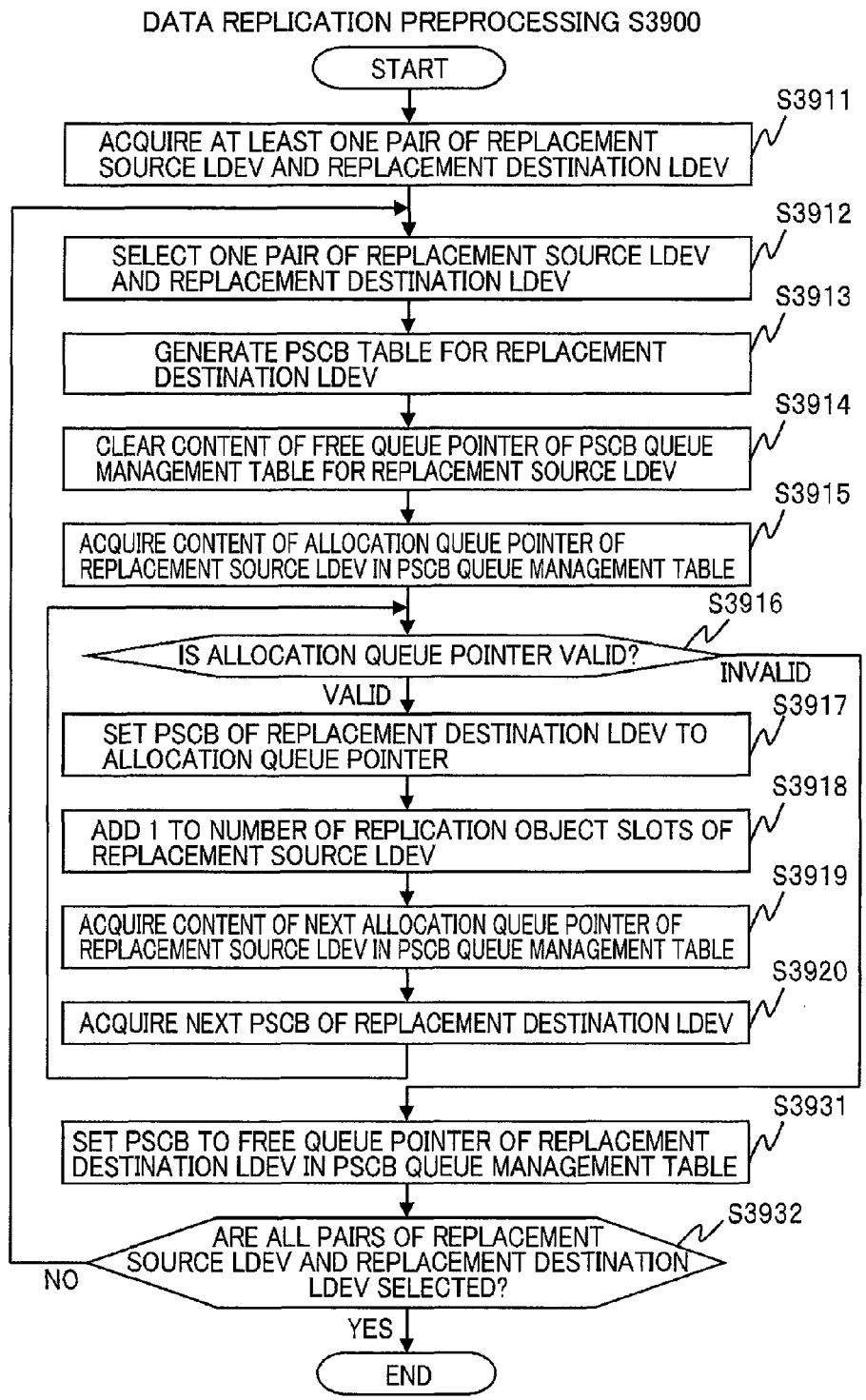
FIG. 39 is a flowchart explaining data replication preprocessing S3900.

FIG. 39 shows a flowchart explaining the processing in S3018 of FIG. 30 (hereinafter referred to as data replication preprocessing S3900). The processing is performed for each pool 931. Hereinbelow, the data replication preprocessing S3900 is described with reference to the drawing.

First, the PVOL replacement processing part 713 acquires one or more pairs of: a first type LDEV forming the PVOL 53 of the replacement source (hereinafter referred to as a replacement source LDEV); and a first type LDEV forming the PVOL 53 of the replacement destination (hereinafter referred to as a replacement destination LDEV) (S3911). Note that the PVOL replacement processing part 713 acquires the replacement source LDEV and the replacement destination LDEV at or before execution of, for example, the above-mentioned replacement destination PVOL generation processing S3100, and holds (stores) both the LDEVs until the execution of the replication preprocessing S3900.

The PVOL replacement processing part 713 then selects one of the acquired pairs of the replacement source LDEV and replacement destination LDEV (S3912).

The PVOL replacement processing part 713 then generates and stores a PSCB table 1400 of the replacement destination LDEV of the pair acquired in S3912 (S3913).

The PVOL replacement processing part 713 then clears the content of the free queue pointer 2612, of the replacement source LDEV of the pair acquired in S3912, in the PSCB queue management table 2600 (unused state (free state) of the first slot of the replacement source LDEV is cleared) (S3914).

The PVOL replacement processing part 713 then acquires the content of the allocation queue pointer 2613 (the storage location of the PSCB), of the replacement source LDEV of the pair acquired in S3912, in the PSCB queue management table 2600 (S3915).

The PVOL replacement processing part 713 then checks whether or not the acquired content of the allocation queue pointer 2613 is valid (S3916). If the acquired content is valid (S3916: valid), the process proceeds to S3917. If the acquired content is invalid (e.g., "NULL," "0," or the like is set) (S3916: invalid), the process proceeds to S3931 (if the content of the allocation queue pointer 2613 is invalid, the PSCB of the corresponding replacement destination LDEV is registered to the free queue).

In S3917, the PVOL replacement processing part 713 sets the allocation queue pointer 2613 of the replacement source LDEV of the pair acquired in S3912, in the PSCB queue management table 2600, to one of addresses of PSCBs of the replacement destination LDEV generated in S3913.

The PVOL replacement processing part 713 then adds 1 to the number of slots to be replicated 2713 of the replacement source LDEV in the data replication progress management table 2700 (S3918).

The PVOL replacement processing part 713 then acquires the content of the next (of a record which has not been selected) allocation queue pointer 2613 of the PSCB queue management table 2600 of the replacement source LDEV of the pair acquired in S3912 (S3919).

The PVOL replacement processing part 713 then acquires a PSCB (PSCB of the PSCB table 1400 generated in S3913, but other than the PSCB selected in S3917) of the replacement destination LDEV (S3920), and the process proceeds back to S3916.

In S3931, the PVOL replacement processing part 713 sets the address of the PSCB of the replacement destination LDEV of the pair acquired in S3912, to the free queue pointer 2612 of the PSCB queue management table 2600.

In S3932, the PVOL replacement processing part 713 determines whether or not all of the pairs of the replacement source LDEV and the replacement destination LDEV have been acquired. If all of the pairs have been acquired (S3932: YES), the process is terminated. If all of the pairs have not been acquired (S3932: NO), the process proceeds back to S3912

<Date Replication Processing>

Figure 40:
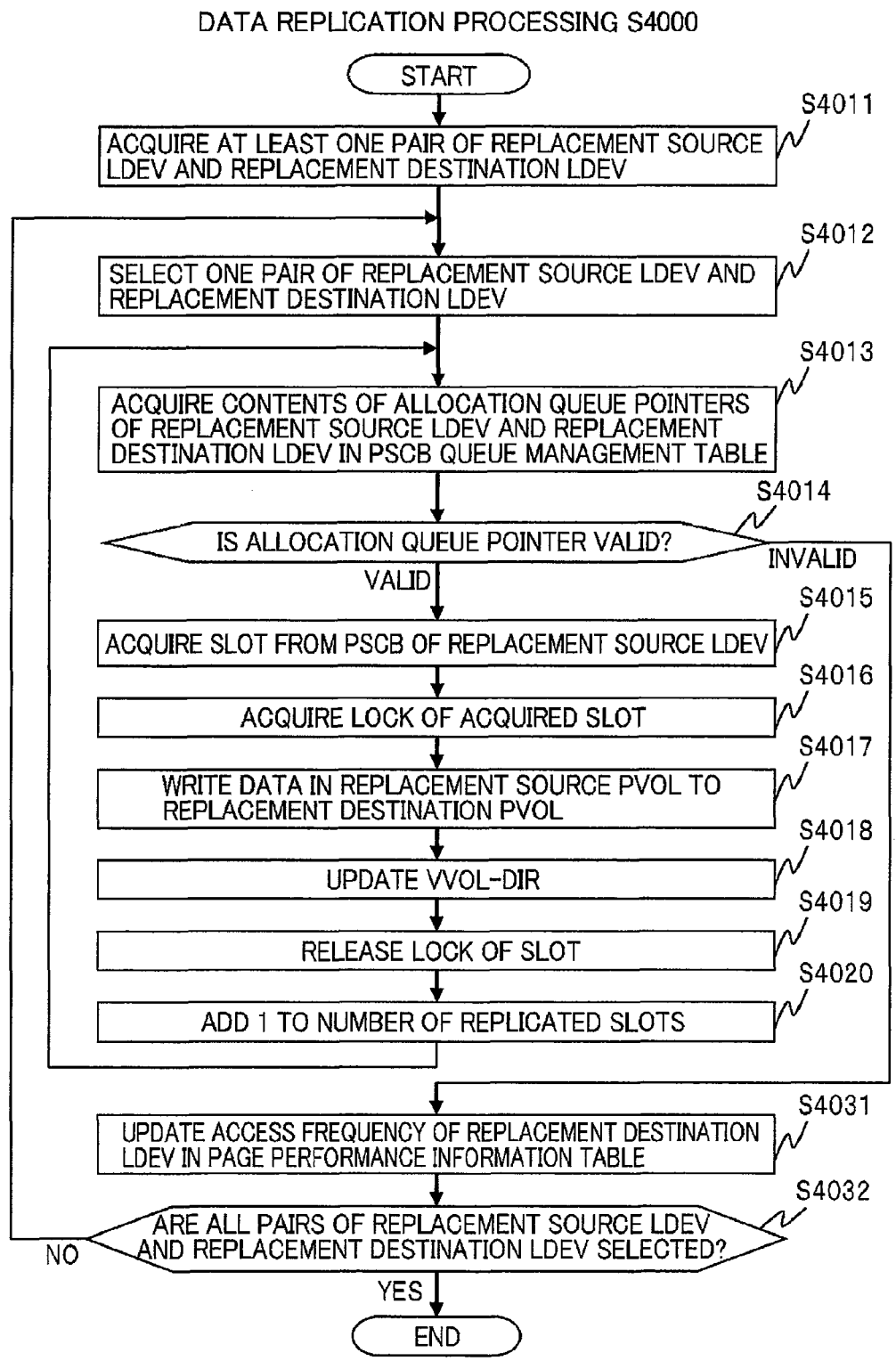
FIG. 40 is a flowchart explaining data replication processing S4000.

FIG. 40 shows a flowchart explaining the processing in S3019 of FIG. 30 (hereinafter referred to as data replication processing S4000). The processing is performed for each pool 931. Hereinbelow, the data replication processing S4000 is described with reference to the drawing.

First, the PVOL replacement processing part 713 acquires one or more pairs of the replacement source LDEV and the replacement destination LDEV (S4011). Note that the PVOL replacement processing part 713 acquires the replacement source LDEV and the replacement destination LDEV at or before execution of, for example, the above-mentioned replacement destination PVOL generation processing S3100, and holds (stores) both the LDEVs until the execution of the replication processing S4000.

The PVOL replacement processing part 713 then selects one of the acquired pairs of the replacement source LDEV and the replacement destination LDEV (S4012).

The PVOL replacement processing part 713 then acquires: the content (the storage location of PSCB) of the allocation queue pointer 2613, of the replacement source LDEV of the pair acquired in S4012, in the PSCB queue management table 2600; and the content of the allocation queue pointer 2613, of the replacement destination LDEV of the pair acquired in S4012, in the PSCB queue management table 2600 (S4013).

The PVOL replacement processing part 713 then checks whether or not the content of the allocation queue pointer 2613 of the acquired replacement source LDEV is valid (S4014). If the content of the allocation queue pointer 2613 is valid (S4014: valid), the process proceeds to S4015. If the content of the allocation queue pointer 2613 is invalid (e.g., "NULL," "0," or the like is set) (S4014: invalid), the process proceeds to S4031.

In S4015, the PVOL replacement processing part 713 acquires the first slot of the PVOL 53 (the value of the first type LDEV slot address 1414 of the record shown in FIG. 14) from the PSCB of the replacement source LDEV. Subsequently, the PVOL replacement processing part 713 acquires the lock of the acquired first slot (exclusive control is started after acquisition of the lock) (S4016).

The PVOL replacement processing part 713 then reads data of the first slot of the acquired PVOL 53 from the cache memory 14, and writes the read data in the first slot (the PVOL 53 of the replacement destination) identified by the PSCB of the replacement destination LDEV (S4017).

The PVOL replacement processing part 713 then changes the value of the PSCB pointer 1513 of the VVOL-DIR 1500 to the PSCB of the replacement destination LDEV (S4018).

The PVOL replacement processing part 713 then releases the above-mentioned lock (exclusive control is ended) of the first slot acquired in S4016 (S4019).

The PVOL replacement processing part 713 then adds 1 to the number of replicated slots 2712 of the replacement source LDEV of the data replication progress management table 2700 (S4020). Subsequently, the process proceeds back to S4013, then the PVOL replacement processing part 713 acquires the content of the next allocation queue pointer 2613 of the replacement source LDEV and the replacement destination LDEV, and repeats the above processing.

In S4031, the PVOL replacement processing part 713 updates the content of the access frequency 2812, of the replacement source LDEV acquired in S4012, in the page performance information table 2800 to the access frequency 2812 of the replacement destination LDEV acquired at S4012.

In S4032, the PVOL replacement processing part 713 determines whether or not all of the pairs of the replacement source LDEV and the replacement destination LDEV have been acquired. If all of the pairs have been acquired (S4032: YES), the process is terminated. If all of the pairs have not been acquired (S4032: NO), the process proceeds back to S4012

As described above, in replacing the PVOL 53, if the tier arrangement processing mode is set to "AUTO," the storage apparatus 10 can start processing for the replacement while preventing the tier arrangement processing S3300 from starting by setting the state 2216 of the pool information table 2200 to "under replacement processing." Thus, the replacement of the PVOL 53 is performed preferentially. In addition, the processing for the replacement of the PVOL 53 and the tier arrangement processing S3300 are controlled so that both processing are not performed concurrently. This avoids deterioration of the performance of the storage apparatus 10 due to concurrent execution of processing for the replacement of the PVOL 53 and the tier arrangement processing S3300.

In replacing the PVOL 53, if the tier arrangement processing mode is set to "OFF," the storage apparatus 10 starts the replacement without preventing the tier arrangement processing S3300 from starting. Thus, the storage apparatus 10 can control whether or not the processing for the replacement of the PVOL 53 is given precedence over the tier arrangement processing S3300 by user's setting the tier arrangement processing mode. This enables control according to users' various needs.

In performing processing for the replacement of the PVOL 53, if the tier arrangement processing S3300 is already under execution, the storage apparatus 10 waits for the completion of the tier arrangement processing S3300 to start processing for replacement of the PVOL 53. Thus, it is possible to surely prevent processing for the replacement of the PVOL 53 and the tier arrangement processing S3300 from being concurrently executed.

In performing the tier arrangement processing S330, if the tier arrangement processing mode is set to "AUTO" and concurrently processing for the replacement of the PVOL 53 is under execution, the storage apparatus 10 waits for the completion of the processing for the replacement of the PVOL 53 to start the tier arrangement processing S3300. Thus, it is possible to surely prevent processing for the replacement of the PVOL 53 and the tier arrangement processing S3300 from being concurrently executed.

<Processing In Reading>

Figure 41:
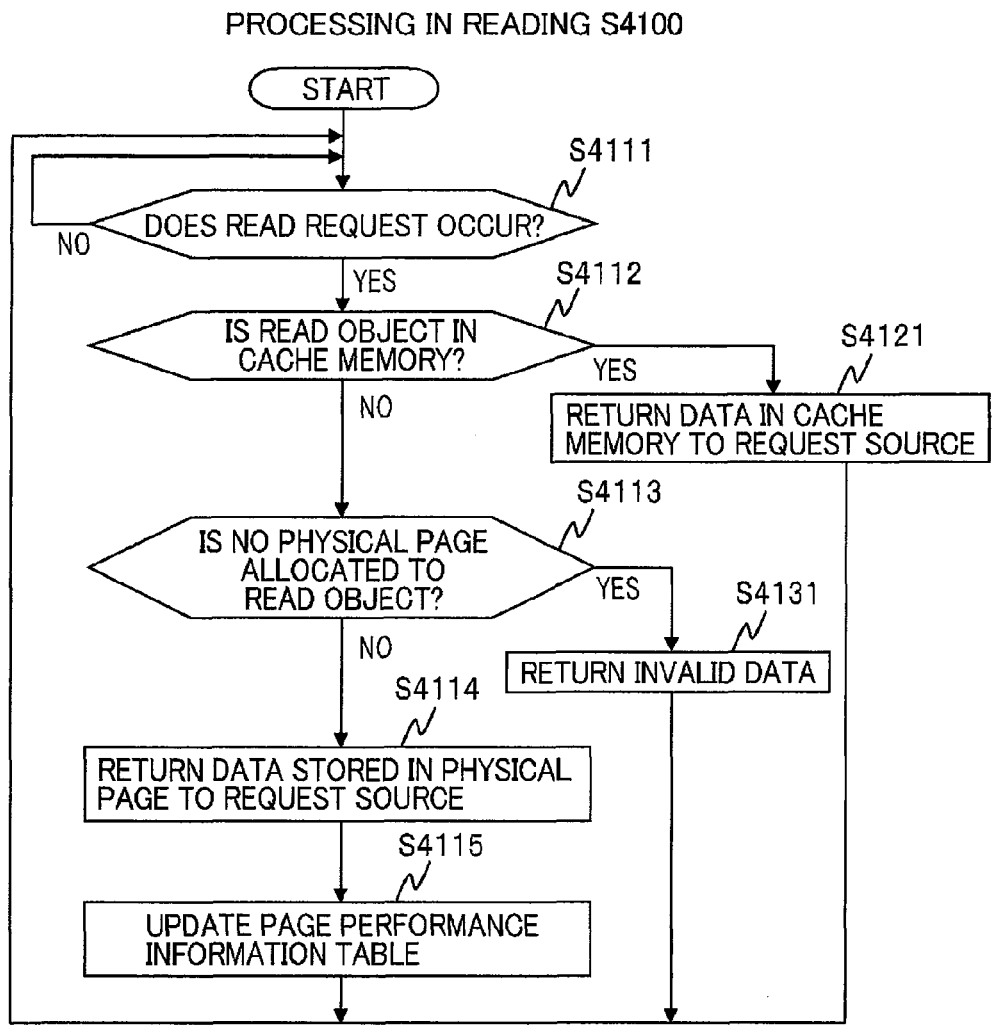
FIG. 41 is a flowchart explaining processing in reading S4100.

FIG. 41 shows a flowchart explaining processing (hereinafter referred to as processing in reading S4100) performed by the I/O processing part 711 when a data read request to a logical page occurs during execution of processing in S3019 of the PVOL replacement processing S3000 shown in FIG. 30, i.e., the data replication processing S4000 shown in FIG. 40. Hereinbelow, the processing in reading S4100 is described with reference to the figure.

When detecting that a data read request occurs (S4111: YES), the I/O processing part 711 checks whether or not there exists read object data (real data (data in physical page) corresponding to the logical page designated as a read object) in the cache memory (S4112). If there exists read object data (S4112: YES), the I/O processing part 711 reads the data and transmits the data to the request source (the server apparatus 3) (S4121). Subsequently, the process proceeds back to S4111.

On the other hand, if there exists no read object in the cache memory 14 (S4112: NO), the I/O processing part 711 references to the page mapping table 3200 to determine whether or not any physical page is currently allocated to the logical page of the read object (S4113). If no physical page is allocated (S4113: YES), the I/O processing part 711 reads invalid data (e.g., "NULL," "0," or the like) from the storage area of the invalid data for the PVOL 53, and transmits the data to the request source (S4131). Subsequently, the process proceeds back to S4111.

On the other hand, if a physical page is allocated (S4113: NO), the I/O processing part 711 reads the data stored in the physical page from the physical drive 171 and transmits the data to the request source (S4114). In this case, the I/O processing part 711 updates the access frequency 2812 (read times 28121) of the physical page in the page performance information table 2800 (S4115). Subsequently, the process proceeds back to S4111.

As described above, upon occurrence of a data read request from the server apparatus 3 during execution of the processing for the replacement of the PVOL 53, if the read object data is stored in the cache memory 14, the storage apparatus 10 reads the data from the cache memory and transmits the data to the server apparatus 3. If the read object data is not stored in the cache memory 14, the storage apparatus 10 reads the data from the physical drive 171 and transmits the data to the server apparatus 3. Thus, even during execution of the processing for the replacement of the PVOL 53, the storage apparatus 10 can appropriately respond to any data read request from the server apparatus 3.

<Processing In Writing>

Figure 42:
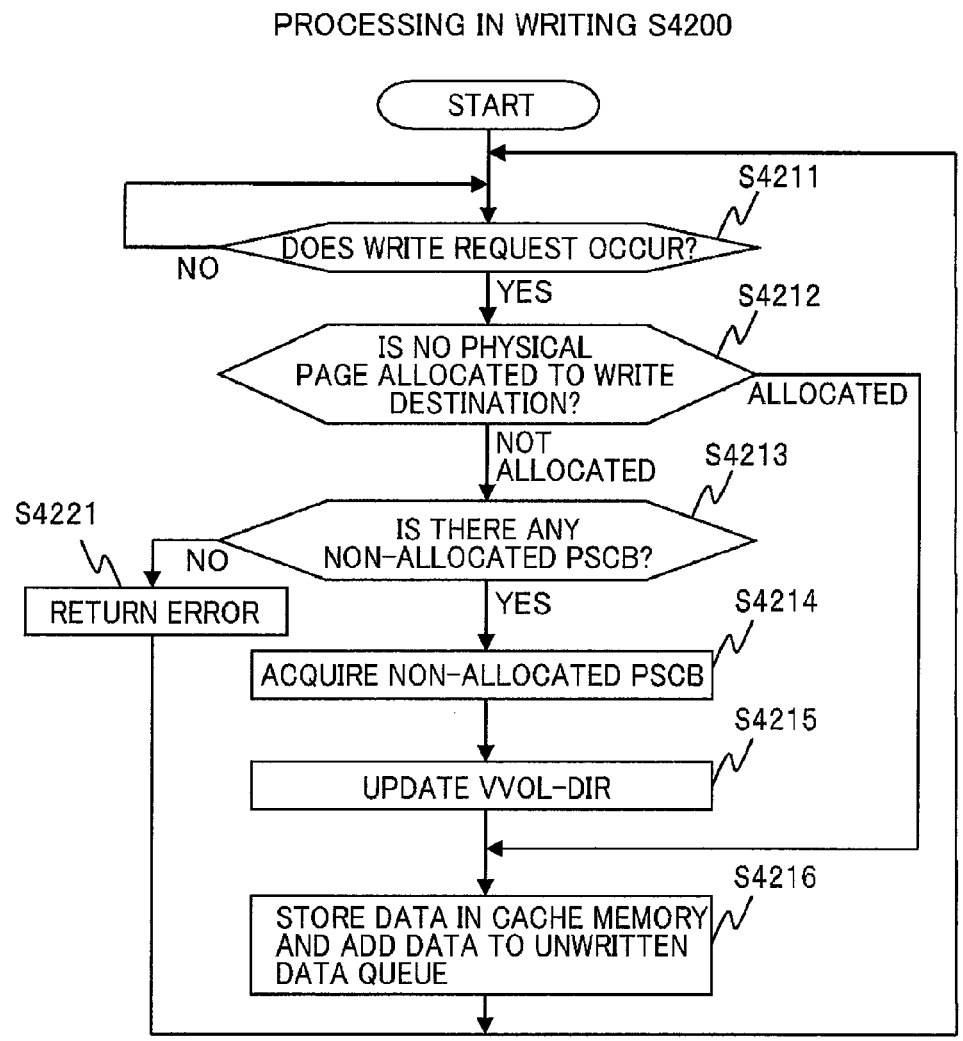
FIG. 42 is a flowchart explaining processing in writing S4200.

FIG. 42 shows a flowchart explaining processing (hereinafter referred to as processing in writing S4200) performed by the I/O processing part 711 when a data write request to a logical page occurs during execution of processing in S3019 of the PVOL replacement processing S3000 shown in FIG. 30, i.e., the data replication processing S4000 shown in FIG. 40. Hereinbelow, the processing in writing S4200 is described with reference to the drawing.

When detecting that a data write request occurs (S4211: YES), the I/O processing part 711 references to the page mapping table 3200 to determine whether or not any physical page is currently allocated to the logical page designated as a write destination (S4212). If a physical page is allocated (S4212: allocated), the process proceeds to S4216.

On the other hand, if no physical page is allocated to the logical page specified as the write destination (S4212: not allocated), the I/O processing part 711 references to the PSCB queue management table 2600 to check whether or not there exists any un-allocated PSCB (PSCB for which a valid value is set to the free queue pointer 2612) so that a storage area of the PVOL 53 as the write destination can be secured (S4213). If there exists no unallocated PSCB (S4213: NO), the I/O processing part 711 transmits an error message to the request source (the server apparatus 3) (S4221).

On the other hand, If there exists unallocated PSCB, the I/O processing part 711 acquires a necessary number of PSCBs to be secured as the write destination (S4214), and allocates the physical pages corresponding to the acquired PSCBs to logical pages (addresses of acquired PSCBs and corresponding PVOL addresses are registered to the VVOL-DIR 1500) (S4215). Note that, when the above-mentioned PSCB is acquired, the I/O processing part 711 preferentially selects a PSCB having, for example, a higher tier level (the content of the tier number 2616 of the PSCB queue management table 2600) according to predefined selection criteria (policy).

The I/O processing part 711 then stores write data in the cache memory 14, and registers the data (queue data) corresponding to the logical page to which physical page is allocated in S4215, to a destage processing wait queue (wait queue for write processing to the physical drive 171) (S4216). Subsequently, the process proceeds back to S4211.

As described above, upon occurrence of a data write request from the server apparatus 3 during execution of processing for the replacement of the PVOL 53, if there exists a physical page as a destination of write data, the storage apparatus 10 writes the write data to the physical page. If there does not exist the physical page, the storage apparatus 10 allocates an unallocated physical page to write the write data. Thus, even during execution of the processing for the replacement of the PVOL 53, the storage apparatus 10 can appropriately respond to any data write request from the server apparatus 3.

<Destage Processing>

Figure 43:
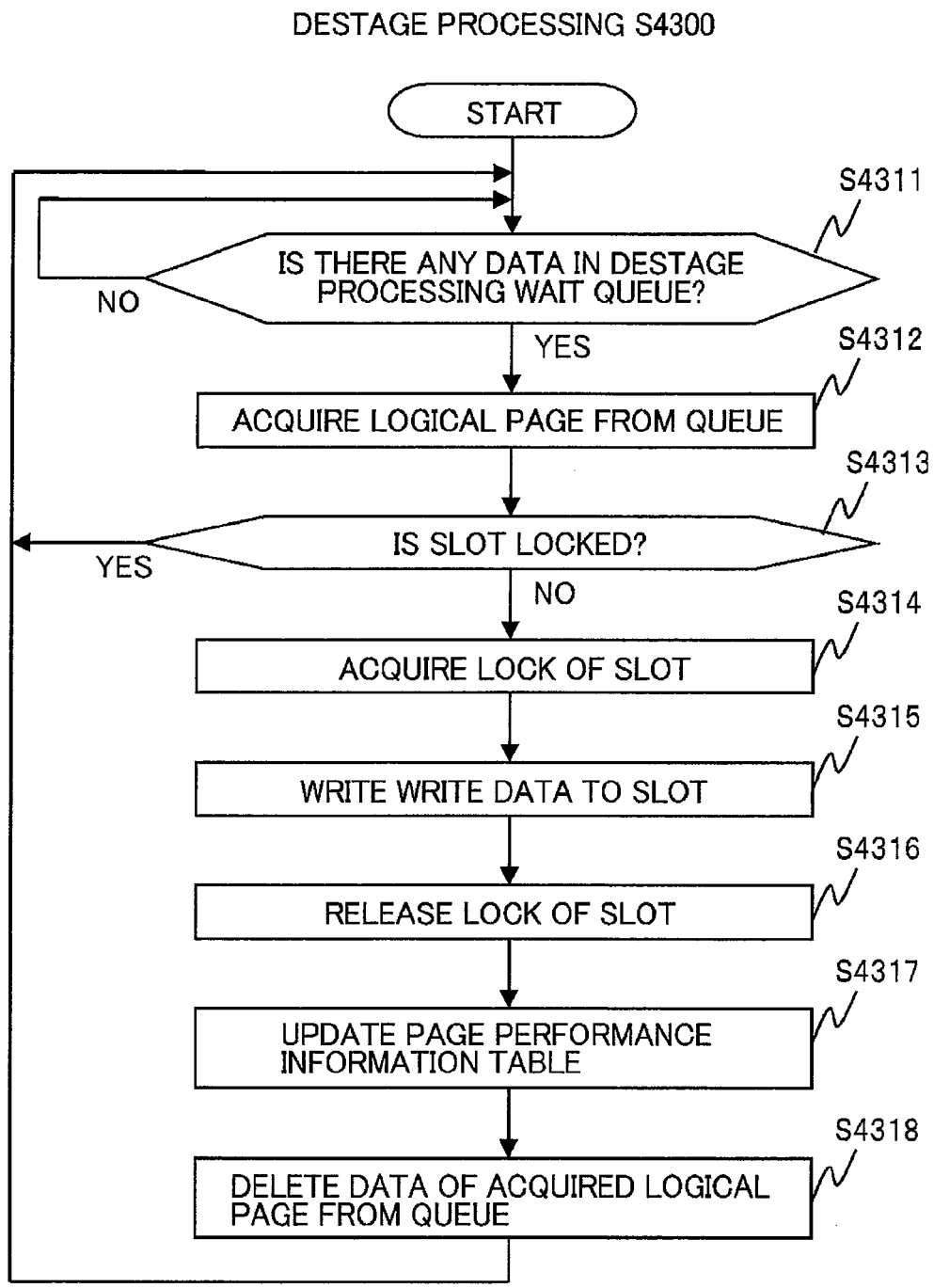
FIG. 43 is a flowchart explaining destage processing S4300.

FIG. 43 shows a flowchart explaining processing (hereinafter referred to as destage processing S4300) performed by the I/O processing part 711 when processing related to distaging occurs during execution of processing in S3019 of the PVOL replacement processing S3000 shown in FIG. 30, i.e., the data replication processing S4000 shown in FIG. 40. Hereinbelow, the destage processing S4300 is described with reference to the drawing.

When detecting that data is registered in the destage processing wait queue (S4311: YES), the I/O processing part 711 acquires a logical page therefrom (S4312). The I/O processing part 711 then acquires the PSCB of the VVOL-DIR 1500 and checks whether or not data in the first slot corresponding to the physical page associated with the logical page is locked (S4313). If the data in the first slot is locked (S4313: YES), the process proceeds to S4311.

On the other hand, If the data in the first slot is not locked (S4313: NO), the I/O processing part 711 acquires a lock of the first slot (S4314), and writes write data stored in the cache memory 14 in S4216 (destaging) (S4315). After the above-mentioned write is completed, the I/O processing part 711 then releases the above-mentioned lock of the first slot (S4316).

Subsequently, the I/O processing part 711 updates the access frequency 2812 (write times 28122) of the first slot (physical page) of the page performance information table 2800 (S4317).

In S4318, the I/O processing part 711 deletes data of the logical page from the destage processing wait queue. Subsequently, the process proceeds back to S4311.

As described above, the storage apparatus 10 of the present embodiment replicates the data stored in the physical drive 171 as the replacement source to another physical drive 171 as the replacement destination in units of a slot (first slot), while exclusive control is performed on the first slot under replication execution. Thus, while the exclusive control is performed on the first slot, the I/O processing part 711 does not perform destaging of the first slot and performs destaging on the first slot of the physical drive 171 as a replacement destination if the lock is released after completion of replication of the first slot. Accordingly, destaging of the data stored in the cache memory 14 can be safely performed.

As described above, the storage apparatus 10 of the present embodiment can cope with the case where a data read request is made from the server apparatus 3 during execution of processing for the replacement of the PVOL 53, as well as the case where a data write request is made from the server apparatus 3 during execution of processing for the replacement of the PVOL 53. In addition, the storage apparatus 10 can safely perform destaging of the data stored in the cache memory 14. Thereby, according to the storage apparatus 10 of the present embodiment, a physical device forming a storage pool in Thin Provisioning functions can be safely replaced while service to the server apparatus 3 is being provided.

In the above, a preferable embodiment of the present invention has been described. However, the embodiment is exemplary for the purpose of describing the present invention and not intended to limit the scope of the present invention only to the embodiment. The present invention may be implemented in various other modes.

The invention claimed is:

1. A storage apparatus comprising:
   an I/O processing part which writes data to a physical drive or reads data from the physical drive in response to a data write request or a data read request transmitted from an external device;
   a storage area management part which implements a Thin Provisioning function by providing the external device with a storage area of the physical drive in units of a virtual volume which is a logical storage area, and by allocating a storage area of the physical drive managed as a storage pool to a logical page in units of a physical page that is a management unit of the storage area of the physical drive, the logical page being a management unit of a storage area of the virtual volume;
   a tier arrangement processing part which classifies the physical drive into tiers, which manages an access frequency of each of the logical pages, and which, when the access frequency of the logical page satisfies a predefined condition, allocates a migration destination physical page that is the physical page belonging to a tier different from a tier to which a migration source physical page that is the physical page currently allocated to the logical page belongs, and performs tier arrangement processing to replicate data stored in the migration source physical page to the migration destination physical page; and
   a replacement processing part which receives a request to replace the physical drive in units of a physical device that is a physical storage device including a storage area of the physical drive, and performs replacement processing for the physical drive by replicating data stored in the physical device of a replacement source to the physical device of a replacement destination, and by reallocating a storage area of the physical device of the replacement source to the storage area of the virtual volume, wherein
   the storage apparatus stores a designation of a tier arrangement processing mode which is a processing mode of the tier arrangement processing, and
   in performing the replacement processing, when a first processing mode is designated as the tier arrangement processing mode, the replacement processing part cancels start of the tier arrangement processing, and starts the replacement processing.

2. The storage apparatus according to claim 1, wherein
in performing the replacement processing, when a second processing mode is designated as the tier arrangement processing mode, the replacement processing part starts the replacement processing without cancelling the start of the tier arrangement processing,
in performing the replacement processing, when the tier arrangement processing is under execution, the replacement processing part starts the replacement processing after the tier arrangement processing is completed, and
in performing the tier arrangement processing, when the first processing mode is designated as the tier arrangement processing mode and concurrently the replacement processing is under execution, the tier arrangement processing part starts the tier arrangement processing after the replacement processing is completed,
the storage apparatus comprising a cache memory in which data to be written to the physical drive or data read from the physical drive is stored, wherein
upon occurrence of the read request of the data during execution of the replacement processing,
if the data to be read is stored in the cache memory, the I/O processing part reads the data from the cache memory and transmits the data to the external device, and
if the data to be read is not stored in the cache memory, the I/O processing part reads the data from the physical drive and transmits the data to the external device,
upon occurrence of the write request of the data during execution of the replacement processing,
if there exists the physical page as the write destination of the data to be written, the I/O processing part writes the data to be written to the physical page, and
if there exists no physical page as the write destination of the data to be written, the I/O processing part allocates a physical page not allocated yet, and writes the data to be written to the allocated physical page, the I/O processing part performs destage of data staged in the cache memory in units of a slot which is a management unit of a storage area of the storage pool,
the replacement processing part replicates data stored in the physical device of the replacement source to the physical device of the replacement destination in units of the slot, and performs an exclusive control over the slot under replication execution, and
the I/O processing part does not perform the destage for the slot when the exclusive control is performed over the slot,
the tier is classified based on at least one of a type, a configuration, and a performance of the physical drive,
the storage area of the physical page is configured by using a storage area of a RAID group which includes a plurality of the physical drives, the storage apparatus further comprising:
a channel control device which communicates with the external device;
a drive control device which writes data to the physical drive or reads data from the physical drive; and
a processor control device which transfers data with at least any one of the channel control device, drive control device, and the cache memory.

3. The storage apparatus according to claim 1, wherein
in performing the replacement processing, when a second processing mode is designated as the tier arrangement processing mode, the replacement processing part starts the replacement processing without cancelling the start of the tier arrangement processing.

4. The storage apparatus according to claim 1, wherein
in performing the replacement processing, when the tier arrangement processing is under execution, the replacement processing part starts the replacement processing after the tier arrangement processing is completed.

5. The storage apparatus according to claim 1, wherein
in performing the tier arrangement processing, when the first processing mode is designated as the tier arrangement processing mode and concurrently the replacement processing is under execution, the tier arrangement processing part starts the tier arrangement processing after the replacement processing is completed.

6. The storage apparatus according to claim 1, wherein
the storage apparatus includes a cache memory in which data to be written to the physical drive or data read from the physical drive is stored;
upon occurrence of the read request of the data during execution of the replacement processing,
if the data to be read is stored in the cache memory, the I/O processing part reads the data from the cache memory and transmits the data to the external device, and
if the data to be read is not stored in the cache memory, the I/O processing part reads the data from the physical drive and transmits the data to the external device.

7. The storage apparatus according to claim 1, wherein
upon occurrence of the write request of the data during execution of the replacement processing,
if there exists the physical page as the write destination of the data to be written, the I/O processing part writes the data to be written to the physical page, and
if there exists no physical page as the write destination of the data to be written, the I/O processing part allocates a physical page not allocated yet, and writes the data to be written to the allocated physical page.

8. The storage apparatus according to claim 1, wherein
the storage apparatus includes a cache memory in which data to be written to the physical drive or data read from the physical drive is stored,
the I/O processing part performs destage of data staged in the cache memory in units of a slot which is a management unit of a storage area of the storage pool,
the replacement processing part replicates data stored in the physical device of the replacement source to the physical device of the replacement destination in units of the slot, and performs an exclusive control over the slot under replication execution,
the I/O processing part does not perform the destage for the slot when the exclusive control is performed over the slot.

9. The storage apparatus according to claim 1, wherein
the tier is classified based on at least one of a type, a configuration, and a performance of the physical drive.

10. The storage apparatus according to claim 1, wherein
the storage area of the physical page is configured by using a storage area of a RAID group which includes a plurality of the physical drives.

11. The storage apparatus according to claim 1, wherein
the storage apparatus includes:
a channel control device which communicates with the external device;
a drive control device which writes data to the physical drive or reads data from the physical drive;
a cache memory in which data to be written to the physical drive or data read from the physical drive is stored; and a processor control device which transfers data with at least any one of the channel control device, drive control device, and the cache memory.

12. A method of controlling a storage apparatus which writes data to a physical drive or reads data from the physical drive in response to a data write request or a data read request transmitted from an external device, wherein the storage apparatus implements a Thin Provisioning function by providing the external device with a storage area of the physical drive in units of a virtual volume which is a logical storage area, and by reallocating a storage area of the physical drive managed as a storage pool to a logical page in units of a physical page that is a management unit of the storage area of the physical drive, the logical page being a management unit of a storage area of the virtual volume, the storage apparatus classifies the physical drive into tiers, manages an access frequency for each of the logical pages, and, when the access frequency of the logical page satisfies a predefined condition, allocates a migration destination physical page that is the physical page belonging to a tier different from a tier to which a migration source physical page that is the physical page currently allocated to the logical page belongs, and performs tier arrangement processing to replicate data stored in the migration source physical page to the migration destination physical page, the storage apparatus receives a request to replace the physical drive in units of a physical device that is a physical storage device including a storage area of the physical drive, and performs replacement processing for the physical drive by replicating data stored in the physical device of a replacement source to the physical device of a replacement destination, and by reallocating a storage area of the physical device of the replacement source to the storage area of the virtual volume, wherein the storage apparatus stores a designation of a tier arrangement processing mode which is a processing mode of the tier arrangement processing, in performing the replacement processing, when a first processing mode is designated as the tier arrangement processing mode, the storage apparatus cancels start of the tier arrangement processing, and then starts the replacement processing.

13. The method according to claim 12, wherein
in performing the replacement processing, when a second processing mode is designated as the tier arrangement processing mode, the storage apparatus starts the replacement processing without cancelling the start of the tier arrangement processing.

14. The method according to claim 12, wherein
in performing the replacement processing, when the tier arrangement processing is under execution, the storage apparatus starts the replacement processing after the tier arrangement processing is completed.

15. The method according to claim 12, wherein
in performing the tier arrangement processing, when the first processing mode is designated as the tier arrangement processing mode and concurrently the replacement processing is under execution, the storage apparatus starts the tier arrangement processing after the replacement processing is completed.

* * * * *